(12) United States Patent
Ishiwata et al.

(10) Patent No.: US 9,605,093 B2
(45) Date of Patent: Mar. 28, 2017

(54) BIAXIALLY STRETCHED POLYPROPYLENE FILM FOR CAPACITORS

(71) Applicant: Oji Holdings Corporation, Tokyo (JP)

(72) Inventors: Tadakazu Ishiwata, Chiba (JP); Yuichi Shishido, Otsu (JP)

(73) Assignee: OJI HOLDINGS CORPORATION, Tokyo (JP)

( * ) Notice: Subject to any disclaimer, the term of this patent is extended or adjusted under 35 U.S.C. 154(b) by 271 days.

(21) Appl. No.: 14/370,918

(22) PCT Filed: Jan. 8, 2013

(86) PCT No.: PCT/JP2013/050120
§ 371 (c)(1),
(2) Date: Jul. 7, 2014

(87) PCT Pub. No.: WO2013/105552
PCT Pub. Date: Jul. 18, 2013

(65) Prior Publication Data
US 2015/0140266 A1    May 21, 2015

(30) Foreign Application Priority Data

Jan. 11, 2012   (JP) .................. 2012-002849

(51) Int. Cl.
*C08F 110/06*   (2006.01)
*C08J 5/18*     (2006.01)
(Continued)

(52) U.S. Cl.
CPC ............... *C08F 110/06* (2013.01); *C08J 5/18* (2013.01); *C08K 5/13* (2013.01); *C08L 23/10* (2013.01);
(Continued)

(58) Field of Classification Search
None
See application file for complete search history.

(56) References Cited

U.S. PATENT DOCUMENTS 4,368,304 A * 1/1983 Sato ................... C08F 10/00
502/108
2005/0202958 A1   9/2005 Yoshikiyo et al.

FOREIGN PATENT DOCUMENTS

CN         101172392 A    5/2008
EP         0585869 A1     3/1994
(Continued)

OTHER PUBLICATIONS

Yuichi et al. (WO 2009/060944 A1); (May 2009) [Machine translation to Englsih—provided by applicants].*
(Continued)

*Primary Examiner* — David Sample
*Assistant Examiner* — Donald M Flores, Jr.
(74) *Attorney, Agent, or Firm* — Knobbe Martens Olson & Bear LLP

(57) ABSTRACT

A biaxially stretched polypropylene film for a capacitor containing an isotactic polypropylene. The weight average molecular weight (Mw) of the isotactic polypropylene as measured by gel permeation chromatography (GPC) is 250,000 to 450,000, the molecular weight distribution Mw/Mn is 7 to 12 and Mz/Mn is 20 to 40, and the value of a difference obtained by subtracting a differential distribution value when the logarithmic molecular weight Log(M)=6 from a differential distribution value when Log(M)=4.5 on a molecular weight distribution curve thereof is 8% to 20%. The ultrathin biaxially stretched polypropylene film for a capacitor has superior heat resistance performance and withstands voltage performance.

19 Claims, 1 Drawing Sheet

(51) Int. Cl.
  *H01G 2/00* (2006.01)
  *C08K 5/13* (2006.01)
  *C08L 23/12* (2006.01)
  *H01G 4/18* (2006.01)
  *C08L 23/10* (2006.01)

(52) U.S. Cl.
  CPC .............. *C08L 23/12* (2013.01); *H01G 2/00* (2013.01); *H01G 4/18* (2013.01); *C08J 2323/12* (2013.01); *Y10T 428/24355* (2015.01)

(56) References Cited

FOREIGN PATENT DOCUMENTS

| | | | |
|---|---|---|---|
| GB | 2068981 A | 8/1981 | |
| JP | A-56-110707 | 9/1981 | |
| JP | 58104907 A * | 6/1983 | .............. C08F 10/06 |
| JP | A-58-104907 | 6/1983 | |
| JP | A-04-218507 | 8/1992 | |
| JP | A-10-119127 | 5/1998 | |
| JP | 2004175932 A * | 6/2004 | .............. C08F 10/06 |
| JP | A-2004-175932 | 6/2004 | |
| JP | A-2006-093689 | 4/2006 | |
| JP | A-2006-143975 | 6/2006 | |
| JP | A-2007-137988 | 6/2007 | |
| JP | A-2007-146026 | 6/2007 | |
| JP | A-2009-057473 | 3/2009 | |
| JP | WO 2009060944 A1 * | 5/2009 | .............. C08J 5/18 |
| JP | A-2009-231705 | 10/2009 | |
| JP | 2010280795 A * | 12/2010 | .............. C08J 5/18 |
| JP | A-2010-280795 | 12/2010 | |
| WO | WO 2004/016662 A1 | 2/2004 | |
| WO | WO 2009/060944 A1 | 5/2009 | |

OTHER PUBLICATIONS

Inukai et al. (JP 2004-175932 A); (Jun. 2004) [JPP—Machine Translation to English].*
Ishiwatari et al. (JP 2010-280795 A); (Dec. 2010) [JPP—Machine Translation to English].*
Chiba et al. (JP 58-107907 A); (Jun. 1983) [PAJ—Machine Translation to English].*
Kinokuniya Co., Ltd., Japan Society for Analytical Chemistry—Research Committee of Polymer Analysis, Polymer Analysis Handbook, New Edition, 1995, p. 610.
T. Hayashi et al., Heptad configurational analysis of 13C n.m.r. spectra in highly isotactic polypropylene; Polymer vol. 29, p. 138, 1988.
A. Turner Jones et al., Crystalline Forms of Isotactic Polypropylene; Makromol. Chem, 75, p. 134, 1964.
International Search Report in PCT/JP2013/050120 mailed Apr. 16, 2013.
Office Action in Chinese Patent Application No. 201380005082.2, mailed Mar. 28, 2016.

* cited by examiner

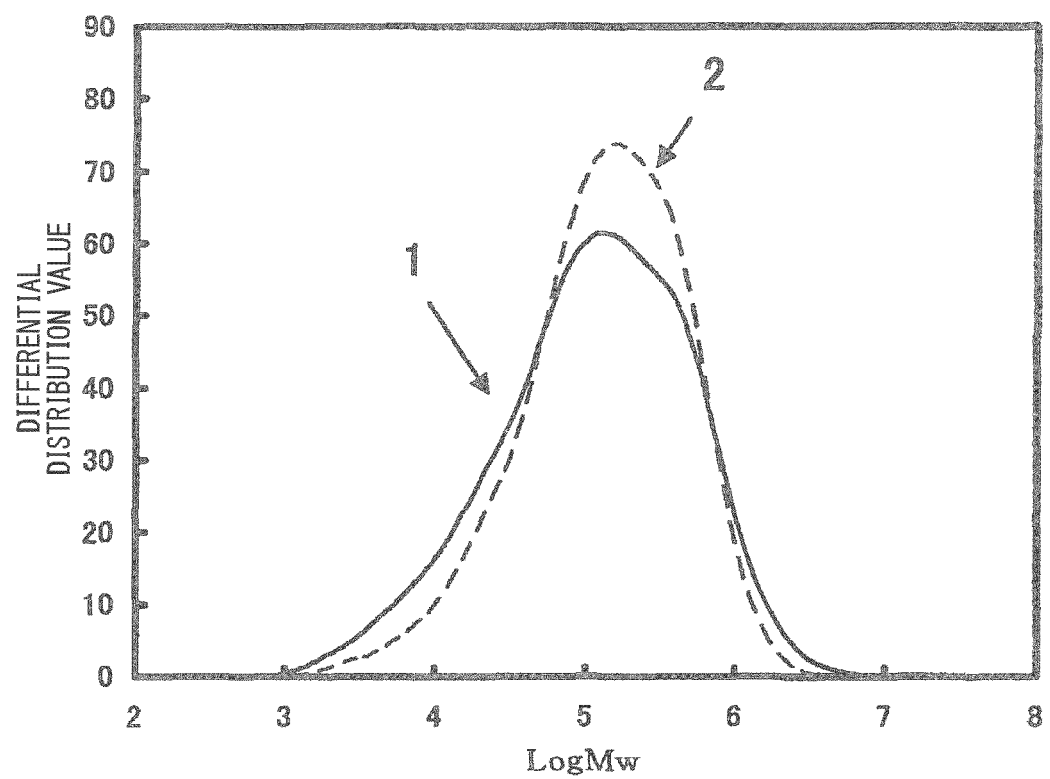

BIAXIALLY STRETCHED POLYPROPYLENE FILM FOR CAPACITORS

TECHNICAL FIELD

The present invention relates to improving the heat resistance and withstand voltage property of an ultrathin capacitor film used in electronic and electrical equipment, and more particularly, to a biaxially stretched polypropylene film for capacitors that is preferable for high-capacitance capacitors having superior withstand voltage characteristics (improved breakdown voltage value) at high temperatures and an extremely thin film thickness.

The present invention claims priority on the basis of Japanese Patent Application No. 2012-002849, filed in Japan on Jan. 11, 2012, the contents of which are incorporated herein by reference.

BACKGROUND ART

Biaxially stretched polypropylene films have superior electrical characteristics such as high withstand voltage performance and low dielectric loss, and due to their high moisture resistance, are widely used as dielectric films for capacitors.

Polypropylene films for capacitors are preferably used in high-voltage capacitors as well as various types of switching power supplies, converters, inverters such as filters, and capacitors used for smoothing. In recent years, the demand for reduced size and higher capacitance of capacitors has become extremely strong, and the demand for reduced thickness of films for capacitors is also increasing.

Moreover, polypropylene film capacitors are beginning to be widely used as smoothing capacitors in inverter power supply circuits in order to control drive motors used in electric vehicles, hybrid vehicles and the like for which demand has increased in recent years.

The capacitors for the inverter power supply equipment used in such vehicles and the like are required to be compact, lightweight and have high capacitance while continuing to operate stably and withstand high direct current voltage over a long period of time and over a wide temperature range of −40° C. to 90° C., or in other words, are required to continue to maintain their electrostatic capacitance.

Consequently, dielectric films for capacitors used in the aforementioned capacitors for inverter power supply equipment are required to have high stretching performance that enables them to be stretched to an extremely thin thickness of 1 μm to 6 μm, and have high withstand voltage characteristics such that the film does not undergo breakdown even if subjected to higher direct current voltages at higher temperatures, or in other words, are required to have improved breakdown voltage. In addition, in capacitors composed of such a film, improvement of long-term durability such that the film does not break down even if continuously subjected to high temperatures and high voltages as described above for a long period of time, namely minimizing time-based changes in electrostatic capacitance, is essential.

A long known method for improving withstand voltage characteristics consist of improving the breakdown voltage value of a film by controlling the crystallinity of a polypropylene resin and the smoothing performance of the film surface. For example, Patent Document 1 discloses a capacitor composed of a highly stereoregular polypropylene resin containing an antioxidant. In addition, Patent Document 2, for example, discloses a technology relating to a film that realizes a high melt crystallization temperature (high crystallinity) and control of surface smoothing performance of the film, and a capacitor thereof, by using a polypropylene resin having high melt tension. However, since simply increasing the stereoregularity or crystallinity of a polypropylene resin leads to a decrease in film stretchability causing the film to break easily in the stretching process, this is not preferable in terms of production. In addition, the technology described in Patent Document 2 is unable to adequately respond to the demands of the rapidly developing capacitor market.

In order to obtain an ultrathin film as described above, it is essential to improve the stretchability of the resin and cast sheet. However, improving this characteristic, namely stretchability, is typically in conflicting with techniques for improving withstand voltage property, or in other words, increasing crystallinity of a polypropylene resin, as previously described.

In contrast, Patent Document 3 discloses a finely surface-roughened film obtained by stretching from a cast stock having a comparatively low level of β crystals using a polypropylene resin having molecular weight distribution and stereoregularity within specific ranges. Since the finely surface-roughened film stretched from a cast stock having a comparatively low level of β crystals is a thin film having withstand voltage characteristics and suitable surface roughness, it is a finely surface-roughened film that attains a level capable of satisfying the aforementioned three characteristics, namely stretching performance, withstand voltage characteristics and long-term durability. However, there is still room for improvement in order to satisfy severe required standards relating to withstand voltage property at high temperatures.

Moreover, Patent Document 4 discloses the realization of both high withstand voltage performance and reduced film thickness without increasing the stereoregularity of a polypropylene resin as a result of adjusting molecular weight distribution by containing a low molecular weight component in the polypropylene resin. However, this is unable to attain a level able to adequately satisfy the withstand voltage performance required by the market.

On the other hand, Patent Document 5 discloses a technology for adjusting Z-average molecular weight (Mz) to realize abroad molecular weight distribution, namely that in which Mw/Mn≥5.4 and Mz/Mn≥20, as an example of a technology for adjusting high molecular weight components of a polypropylene resin. Here, Mw refers to weight average molecular weight and Mn refers to number average molecular weight. However, although effects relating to β crystal formation and film moldability are improved as a result of realizing a molecular weight distribution having such a range, adequate studies have not been carried out with respect to high heat resistance and high withstand voltage, and there can still be said to be room for improvement.

Moreover, a technology for obtaining a polypropylene resin having a broad molecular weight distribution by adjusting high molecular weight components using a single polymerization step, namely a simple method, through the use of catalyst technology, and a technology relating to a film that uses that resin, have been disclosed (Patent Document 6). However, even according to these technologies, it is still considered to be difficult to adequately respond to market needs by realizing both an extremely thin film thickness and withstand voltage property.

In addition, as is disclosed in Patent Document 1 as well, an antioxidant is known to have at least some effect on long-term withstand voltage performance and capacitor electrical performance.

Patent Document 7 discloses a technology for suppressing the dielectric loss of a film to a low level by using a suitable combination and incorporated amounts of phenol-based antioxidants. However, there is nothing exemplified or suggested regarding the service life of a capacitor when subjected to high voltage, or in other words, long-term durability and withstand voltage property at high temperatures. In addition, as a more recent technology, Patent Document 8 discloses a technology for improving insulation resistance of a film at high temperatures by using an antioxidant having a high melting point. However, there is nothing exemplified or suggested in the technology of Patent Document 8 relating to withstand voltage property at high temperatures when subjected to high voltage.

In this manner, the technologies described in Patent Documents 1 to 8 are still unable to satisfy the rigorous demands of the rapidly developing capacitor industry, namely rigorous demands relating to withstand voltage performance of films when loaded at higher voltages at high temperatures.

PRIOR ART DOCUMENTS

Patent Documents

Patent Document 1: Japanese Unexamined Patent Application, First Publication No. H10-119127 (pp. 2-5)

Patent Document 2: Japanese Unexamined Patent Application, First Publication No. 2006-93689 (pp. 2-4)

Patent Document 3: Japanese Unexamined Patent Application, First Publication No. 2007-137988 (pp. 2-4)

Patent Document 4: International Publication No. WO2009-060944 (pp. 3-11)

Patent Document 5: Japanese Unexamined Patent Application, First Publication No. 2004-175932 (pp. 2-4)

Patent Document 6: Japanese Unexamined Patent Application, First Publication No. 2009-57473 (pp. 2-3)

Patent Document 7: Japanese Unexamined Patent Application, First Publication No. 2007-146026 (pp. 2-3)

Patent Document 8: Japanese Unexamined Patent Application, First Publication No. 2009-231705 (pp. 2-4)

DISCLOSURE OF THE INVENTION

Problems to be Solved by the Invention

An object of the present invention is to provide an ultrathin biaxially stretched polypropylene film for a capacitor having high breakdown voltage characteristics under high temperature conditions, and a metallized polypropylene film thereof for a capacitor.

Means for Solving the Problems

The present invention includes an invention of a biaxially stretched polypropylene film for a capacitor described below.

(1) A biaxially stretched polypropylene film for a capacitor comprising an isotactic polypropylene, wherein the weight average molecular weight (Mw) as measured by gel permeation chromatography (GPC) is 250,000 to 450,000, the molecular weight distribution Mw/Mn is 7 to 12, Mz/Mn is 20 to 40, and the difference obtained by subtracting a differential distribution value when the logarithmic molecular weight Log (M)=6 from a differential distribution value when Log(M)=4.5 on a molecular weight distribution curve thereof is 8% to 20%.

(2) The biaxially stretched polypropylene film for a capacitor described in (1), wherein the isotactic polypropylene has stereoregularity in which a mesopentad fraction ([mmmm]) as determined by high-temperature nuclear magnetic resonance (high-temperature NMR) measurement is 94% or more to less than 98%.

(3) The biaxially stretched polypropylene film for a capacitor described in (1) or (2), wherein the isotactic polypropylene contains at least one type of hindered phenol-based antioxidant having a carbonyl group, and the residual content thereof in the film is 4000 ppm (by weight) to 6000 ppm (by weight).

(4) The biaxially stretched polypropylene film for a capacitor described in any of (1) to (3), wherein the biaxially stretched polypropylene film is finely surface-roughened so that the surface roughness on at least one side thereof is such that the center line average roughness (Ra) is 0.05 μm to 0.15 μm and the maximum height (Rz, Rmax as formerly defined in JIS) is 0.5 μm to 1.5 μm.

(5) The biaxially stretched polypropylene film for a capacitor described in any of (1) to (3), wherein the thickness of the biaxially stretched polypropylene film is 1 μm to 6 μm.

(6) The biaxially stretched polypropylene film for a capacitor described in any of (1) to (5), wherein the isotactic polypropylene is obtained by polymerizing in the presence of an olefin-type polymerization catalyst containing a solid titanium catalyst component (I), obtained by reacting an organometallic compound catalyst component (II) with titanium tetrachloride and further contacting with an electron donor (a) and an electron acceptor (b), and the organometallic compound catalyst component (II).

(7) The biaxially stretched polypropylene film for a capacitor described in (6), wherein the solid titanium catalyst component (I) is a solid titanium catalyst component obtained by reacting the organometallic compound catalyst component (II), the electron donor (a) and titanium tetrachloride, and further contacting with the electron donor (a) and the electron acceptor (b).

(8) The biaxially stretched polypropylene film for a capacitor described in (6) or (7), wherein the olefin-type polymerization catalyst is an olefin-type polymerization catalyst containing the solid titanium catalyst component (I), the organometallic compound catalyst component (II) and an aromatic carboxylic acid ester.

Namely, the present invention has the aspects indicated below.

[1] A biaxially stretched polypropylene film for a capacitor containing an isotactic polypropylene, wherein the weight average molecular weight (Mw) of the isotactic polypropylene as measured by gel permeation chromatography (GPC) is 250,000 to 450,000, the molecular weight distribution Mw/Mn of the isotactic polypropylene is 7 to 12 and Mz/Mn is 20 to 40, and the value of a difference obtained by subtracting a differential distribution value when the logarithmic molecular weight Log(M)=6 from a differential distribution value when Log (M)=4.5 on a molecular weight distribution curve thereof is 8% to 20% with respect to the differential distribution value when Log(M)=4.5.

[2] The biaxially stretched polypropylene film for a capacitor described in [1], wherein the isotactic polypropylene has stereoregularity in which a mesopentad fraction ([mmmm]) as determined by high-temperature nuclear magnetic resonance (high-temperature NMR) measurement is 94% or more to less than 98%.

[3] The biaxially stretched polypropylene film for a capacitor described in [1] or [2], wherein the isotactic polypropylene contains at least one type of hindered phenol-based antioxidant having a carbonyl group, and the residual content of the hindered phenol-based antioxidant in the film is 4000 ppm by weight to 6000 ppm by weight with respect to the total weight of the film.

[4] The biaxially stretched polypropylene film for a capacitor described in any of [1] to [3], wherein the biaxially stretched polypropylene film is finely surface-roughened so that the surface roughness on at least one side thereof is such that the centerline average roughness (Ra) is 0.05 µm to 0.15 µm and the maximum height (Rz) is 0.5 µm to 1.5 µm.

[5] The biaxially stretched polypropylene film for a capacitor described in any of [1] to [4], wherein the thickness of the biaxially stretched polypropylene film is 1 µm to 6 µm.

[6] The biaxially stretched polypropylene film for a capacitor described in any of (1) to (5), wherein the isotactic polypropylene is obtained by a method that includes the following steps (1) and (2):

step (1): obtaining a solid titanium catalyst component (I) by contacting an electron donor (a) and an electron acceptor (b) with a reaction product obtained by reacting an organometallic compound catalyst component (II) with titanium tetrachloride; and, step (2): obtaining an isotactic polypropylene by polymerizing propylene in the presence of an olefin-type polymerization catalyst containing the solid titanium catalyst component (I) and the organometallic compound catalyst component (II).

[7] The biaxially stretched polypropylene film for a capacitor described in [6], wherein step (1) is obtaining the solid titanium catalyst component (I) by reacting titanium tetrachloride with the reaction product of the organometallic compound catalyst component (II) and the electron donor (a), and further contacting the electron donor (a) and the electron acceptor (b) with the resulting reaction product.

[8] The biaxially stretched polypropylene film for a capacitor described in [6] or [7], wherein the olefin-type polymerization catalyst is an olefin-type polymerization catalyst containing the solid titanium catalyst component (I), the organometallic compound catalyst component (II) and an aromatic carboxylic acid ester.

Effects of the Invention

The biaxially stretched polypropylene film for a capacitor of the present invention (to also simply be referred to as the "polypropylene film", "film" or "capacitor film") and the isotactic polypropylene that forms a metallized polypropylene film for a capacitor comprise a specific molecular weight distribution since molecular weight distribution is adjusted by incorporating an extremely large amount of a low molecular weight component having an average molecular weight on the order of several ten thousands. Consequently, the film and the isotactic polypropylene demonstrate high breakdown strength and have superior tolerance when subjected to a high voltage at high temperatures.

In addition, since the aforementioned isotactic polypropylene (to also be referred to as "polypropylene resin") has an extremely broad molecular weight distribution and further suitably contains a high molecular weight component, the stretching performance of the resin is high and it is possible to form a thin film therefrom. Consequently, it can also be applied to a capacitor film having an extremely thin film thickness of 1 µm to 6 µm.

As has been described above, use of the biaxially stretched polypropylene film for a capacitor of the present invention enables the effective realization of a higher temperature at which the polypropylene film capacitor can be used, an increase in the rated voltage, a reduction in the size of the capacitor and higher capacitance.

BRIEF DESCRIPTION OF THE DRAWINGS

FIG. 1 is a graph indicating examples of the molecular weight distribution curves of a polypropylene resin 1 of the present invention, containing numerous low molecular weight components and having a broad molecular weight distribution, and a polypropylene resin 2, having a conventional molecular weight distribution.

BEST MODE FOR CARRYING OUT THE INVENTION

The biaxially stretched polypropylene film for a capacitor of the present invention is preferably a film obtained by molding a resin having an isotactic polypropylene as a raw material thereof that is obtained by a method that includes a step (1) for obtaining a solid titanium catalyst component (I) by contacting an electron donor (a) and an electron acceptor (b) with a reaction product obtained by reacting an organometallic compound catalyst component (II), an electron donor (a) as necessary, and titanium tetrachloride, and a step (2) for obtaining an isotactic polypropylene by polymerizing propylene in the presence of an olefin-type polymerization catalyst containing the solid titanium catalyst component (I), the organometallic compound catalyst component (II) and, as necessary, an electron donor (III); wherein, the weight average molecular weight (Mw) of the isotactic polypropylene that forms the film as measured by gel permeation chromatography (GPC) is 250,000 to 450,000, the molecular weight distribution Mw/Mn is 7 to 12, Mz/Mn is 20 to 40, and the value of a difference obtained by subtracting a differential distribution value when the logarithmic molecular weight Log (M)=6 from a differential distribution value when Log (M)=4.5 on a molecular weight distribution curve thereof is 8% to 20% With respect to the differential distribution value when Log (M)=4.5.

The aforementioned olefin-type polymerization catalyst used in the present invention is preferable since it tends to yield a polymer having high stereoregularity and a broad molecular weight distribution.

The polypropylene resin that forms the biaxially stretched polypropylene film for a capacitor of the present invention is a crystalline isotactic polypropylene resin and is a homopolymer of propylene.

Although the polypropylene resin used in the biaxially stretched polypropylene film for a capacitor of the present invention can also be produced by multistage polymerization or mixing a plurality of types of polypropylene, it is preferably a resin obtained by one-step polymerization, or in other words, a single-stage polymerization reaction. Since the raw material resin can be produced using a simple polymer production apparatus in the case the polypropylene raw material resin is a resin obtained by a single-stage polymerization reaction, in addition to being economical, the high molecular weight component in the polypropylene raw material resin is in a more finely dispersed state, thereby making this preferable.

<Method for Producing Polypropylene Raw Material Resin>

The polypropylene raw material resin used to produce the biaxially stretched polypropylene film for a capacitor of the present invention is preferably produced using the following olefin-type polymerization catalyst.

(Olefin-Type Polymerization Catalyst)

The polypropylene raw material resin used in the biaxially stretched polypropylene film for a capacitor of the present invention is preferably obtained by polymerizing propylene in the presence of an olefin-type polymerization catalyst containing a solid titanium catalyst component (I), an organometallic compound catalyst component (II) and, as necessary, an electron donor (III).

Namely, the olefin-type polymerization catalyst in the present invention preferably contains a solid titanium catalyst component (I) and an organometallic compound catalyst component (II). In addition, the aforementioned olefin-type polymerization catalyst may also contain an electron donor (III) as necessary.

(Solid Titanium Catalyst Component (I))

The solid titanium catalyst component (I) can be produced by, for example, a method comprising the following step (1).

Step (1): Obtaining a solid titanium catalyst component (I) by further contacting an electron donor (a) and an electron acceptor (b) with a reaction product obtained by reacting an organometallic compound catalyst component (II) and titanium tetrachloride or a reaction product obtained by reacting the reaction product of the organometallic compound catalyst component (II) and the electron donor (a) with titanium carbon tetrachloride.

Here, the aforementioned step (1) is preferably a step for obtaining the solid titanium catalyst component (I) by further contacting an electron donor (a) and an electron acceptor (b) with a reaction product obtained by reacting the reaction product of the organometallic compound catalyst component (II) and the electron donor (a) with titanium tetrachloride.

The aforementioned titanium tetrachloride can be changed to a titanium compound indicated below as necessary. In addition, the titanium tetrachloride described in the method for preparing the solid titanium catalyst component (I) to be subsequently described can also be substituted with a titanium compound indicated below.

(Titanium Compounds Used to Produce Solid Titanium Catalyst Component (I) of the Present Invention)

Examples of titanium compounds used to produce the solid titanium catalyst component (I) of the present invention include tetravalent titanium compounds represented by the following general formula:

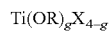

Ti(OR)$_g$X$_{4-g}$ (In the above formula, R preferably represents a hydrocarbon group having 1 to 8 carbon atoms, X represents a halogen atom, and g represents an integer represented by 0≤g≤4).

Specific examples include:
  titanium tetrahalides such as TiCl$_4$ or TiBr$_4$;
  alkoxytitanium trihalides such as Ti(OCH$_3$)Cl$_3$, Ti(OC$_2$H$_5$)Cl$_3$, Ti(O-n-C$_4$H$_9$)Cl$_3$, Ti(OC$_2$H$_5$)Br$_3$ or Ti(O-iso-C$_4$H$_9$)Br$_3$;
  alkoxytitanium dihalides such as Ti(OCH$_3$)$_2$Cl$_2$ or Ti(OC$_2$H$_5$)$_2$Cl$_2$;
  alkoxytitanium halides such as Ti(OCH$_3$)$_3$Cl, Ti(O-n-C$_4$H$_9$)$_3$Cl or Ti(OC$_2$H$_5$)$_3$Br; and,
  tetraalkoxytitaniums such as Ti(OCH$_3$)$_4$, Ti(OC$_2$H$_5$)$_4$, Ti(OC$_4$H$_9$)$_4$ or Ti(O-2-ethylhexyl)$_4$.

Among these, titanium tetrahalides are preferable and titanium tetrachloride is particularly preferable. These titanium compounds may be used alone or two or more types may be used in combination.

(Method for Preparing Solid Titanium Catalyst Component (I))

With respect to the method for preparing the solid titanium catalyst component (I), although the details of a method for obtaining the solid titanium catalyst component (I) by reacting titanium tetrachloride with the reaction product of the organometallic compound catalyst component (II) and the electron donor (a) and further contacting the electron donor (a) and an electron acceptor (b) with the resulting reaction product are described in, for example, Japanese Unexamined Patent Application, First Publication No. S56-110707, a summary thereof is indicated below.

First, a reaction product of the organometallic compound catalyst component (II) and the electron donor (a) is obtained.

The reaction between the organometallic compound catalyst component (II) and the electron donor (a) is preferably carried out in a solvent to be subsequently described for 30 seconds to 5 hours at a reaction temperature of −20° C. to 200° C. and preferably −10° C. to 100° C. There are no restrictions on the order in which the aforementioned organometallic compound catalyst component (II) and the electron acceptor (a) are contacted, the weight ratio at which they are used is 0.1 moles to 8 moles, and preferably 1 mole to 4 moles, of the electron donor (a) with respect to 1 mole of the metal element of the organometallic compound catalyst component (II). The amount of solvent used is preferably 0.5 liters to 5 liters and more preferably 0.5 liters to 2 liters.

In addition, the aforementioned solvent is preferably an aliphatic hydrocarbon.

The reaction product obtained at this stage may be used in the next reaction while still in a liquid state following completion of the reaction without undergoing solid-liquid separation.

Next, the aforementioned reaction product and titanium tetrachloride are contacted.

The reaction between the aforementioned reaction product and titanium tetrachloride is preferably carried out for 5 minutes to 8 hours at a reaction temperature of 0° C. to 200° C. and preferably 10° C. to 90° C. Although an aliphatic hydrocarbon or aromatic hydrocarbon may be used as solvent when reacting the aforementioned reaction product and titanium tetrachloride, the reaction is preferably carried out without using these solvents.

Contact of the aforementioned reaction product and titanium tetrachloride with a preferably used solvent may be carried out in any arbitrary order. In addition, this contact operation, namely a step for adding titanium tetrachloride and to the aforementioned reaction product in a preferably used solvent, is preferably completed within 5 hours. Following completion of contact of prescribed amounts, a mixture of the reaction product, titanium tetrachloride and solvent is preferably held at 10° C. to 90° C. The time during which the mixture is held at this temperature is preferably no longer than 8 hours.

The amounts of the aforementioned reaction product, titanium tetrachloride and solvent used in the reaction are such that the amount of solvent is 0 ml to 3000 ml with respect to 1 mole of titanium tetrachloride, and the ratio of the number of metal atoms in the aforementioned reaction product to the number of Ti atoms in titanium tetrachloride (number of metal atoms of organometallic compound catalyst component (II)/Ti) is preferably 0.05 to 10 and more preferably 0.06 to 0.2.

Following completion of the aforementioned step, the liquid portion is separated and removed by filtration or decantation followed by repeatedly washing with solvent to obtain a solid product. The resulting solid product may be used in the next step while still suspended in the solvent or may be used after drying and removing as a solid.

Next, the electron donor (a) and the electron acceptor (b) are reacted with the aforementioned solid product.

Although this reaction can be carried out without using a solvent, it is preferably carried out using an aliphatic hydrocarbon. The amount of the electron donor (a) used is preferably 10 g to 100 g and more preferably 50 g to 200 g with respect to 100 g of the aforementioned solid product. In addition, the amount of the electron acceptor (b) used is preferably 10 g to 1000 g and more preferably 20 g to 500 g with respect to 100 g of the aforementioned solid product. In addition, the amount of solvent used is preferably 0 ml to 3000 ml and more preferably 100 ml to 1000 ml.

After contacting these components for 30 seconds to 60 minutes at −10° C. to 40° C., they are held for 30 seconds to 5 hours preferably at 40° C. to 200° C. and more preferably at 50° C. to 100° C. The order in which the solid product, electron donor (a), electron acceptor (b) and solvent are contacted is arbitrary. For example, the electron donor (a) and the electron acceptor (b) may be preliminarily contacted before mixing with the solid product, and in this case, the electron donor (a) and the electron acceptor (b) are preferably contacted for 30 minutes to 2 hours at 10° C. to 100° C. followed by cooling to 40° C. or lower and then mixing with the solid product.

After the solid product, electron donor (a) and electron acceptor (b) have been allowed to contact and held at the aforementioned temperature, the liquid portion is removed by filtration or decantation followed by repeatedly washing with solvent to obtain the solid titanium catalyst component (I).

The resulting solid titanium catalyst component (I) can then be dried and removed as a solid or can be used in the next reaction while still suspended in solvent.

(Organometallic Compound Catalyst Component (II) Used to Produce Solid Titanium Catalyst Component (I))

A compound similar to the organometallic compound catalyst component (II) used to polymerize polypropylene to be subsequently described is used for the organometallic compound catalyst component (II) used to produce the solid titanium catalyst component (I). It is preferably an organic aluminum compound represented by the following general formula:

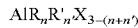

$AlR_nR'_{n'}X_{3-(n+n')}$ (In the above formula, R and R' represent hydrocarbon groups such as alkyl groups, aryl groups, alkaryl groups or cycloalkyl groups, R and R' may also represent alkoxy groups, X represents a halogen such as fluorine, chlorine, bromine or iodine, and n and n' represent arbitrary integers that satisfy the expression $0<n+n'\leq 3$).

Specific examples thereof include trialkyl aluminum compounds such as trimethyl aluminum, triethyl aluminum, tri-n-propyl aluminum, tri-n-butyl aluminum, tri-i-butyl aluminum, tri-n-hexyl aluminum, tri-i-hexyl aluminum, tri-2-methylpentyl aluminum, tri-n-octyl aluminum or tri-n-decyl aluminum, diethyl aluminum monohalides such as diethyl aluminum monochloride, di-n-propyl aluminum monochloride, di-i-butyl aluminum monochloride, diethyl aluminum monofluoride, diethyl aluminum monobromide or diethyl aluminum monoiodide, alkyl aluminum hydrides such as diethyl aluminum hydride, and alkyl aluminum halides such as methyl aluminum sesquichloride, ethyl aluminum sesquichloride, ethyl aluminum dichloride or i-butyl aluminum dichloride. In addition, alkoxyalkyl aluminum compounds such as monoethoxydiethyl aluminum or diethoxymonoethyl aluminum can also be used.

Two or more types of these organic aluminum compounds can also be used after mixing.

(Electron Donor (a) Used to Produce Solid Titanium Catalyst Component (I))

Although the various compounds indicated below can be used for the electron donor (a), in the present invention, preferably ethers are mainly used and other electron donors are used in combination therewith.

Examples of compounds used for the electron donor (a) include organic compounds having an oxygen, nitrogen, sulfur or phosphorous atom, or in other words, ethers, alcohols, esters, aldehydes, fatty acids, ketones, nitriles, amines, amides, urea or thioureas, isocyanates, azo compounds, phosphines, phosphites, phosphinites, thioethers and thioalcohols.

Specific examples of the aforementioned electron donor (a) include ethers such as diethyl ether, di-n-propyl ether, di-n-butyl ether, diisoamyl ether, di-n-pentyl ether, di-n-hexyl ether, di-i-hexyl ether, di-n-octyl ether, di-i-octyl ether, di-n-dodecyl ether, diphenyl ether, ethylene glycol monomethyl ether, diethylene glycol dimethyl ether or tetrahydrofuran, alcohols such as methanol, ethanol, propanol, butanol, pentanol, hexanol, octanol, phenol, cresol, xylenol, ethyl phenol or naphthol, esters such as methyl methacrylate, ethyl acetate, butyl formate, amyl acetate, vinyl butyrate, vinyl acetate, ethyl benzoate, propyl benzoate, butyl benzoate, octyl benzoate, 2-ethylhexyl benzoate, methyl toluylate, ethyl toluylate, 2-ethylhexyl toluylate, methyl anisate, ethyl anisate, propyl anisate, ethyl cinnamate, methyl naphthoate, ethyl naphthoate, propyl naphthoate, butyl naphthoate, 2-ethylhexyl naphthoate or ethyl phenylacetate, aldehydes such as acetoaldehyde or benzaldehyde, fatty acids such as formic acid, acetic acid, propionic acid, butyric acid, oxalic acid, succinic acid, acrylic acid or maleic acid, aromatic acids such as benzoic acid, ketones such as methyl ethyl ketone, methyl isobutyl ketone or benzophenone, nitriles such as acetonitrile, amines such as methylamine, diethylamine, tributylamine, triethanolamine, β-(N,N-dimethylamino)ethanol, pyridine, quinoline, α-picoline, N,N,N',N'-tetramethylhexaethylenediamine, aniline or dimethylaniline, amides such as formamide, hexamethylphosphoric triamide, N,N,N',N',N''-pentamethyl-N'-β-dimethylaminomethylphosphoric triamide or octamethyl pyrophosphoramide, ureas such as N,N,N',N'-tetramethylurea, isocyanates such as phenyl isocyanate or toluyl isocyanate, azo compounds such as azobenzene, phosphines such as ethylphosphine, triethylphosphine, tri-n-butylphosphine, tri-n-octylphosphine, triphenylphosphine or triphenylphosphine oxide, phosphites such as dimethyl phosphite, di-n-octyl phosphite, triethyl phosphite, tri-n-butyl phosphite, triphenyl phosphite, diethyl phosphite, ethylbutyl phosphite or diphenyl phosphite, thioethers such as diethyl thioether, diphenyl thioether, methyl phenyl thioether, ethylene sulfide or propylene sulfide, and thioalcohols such as ethyl thioalcohol, n-propyl thioalcohol or thiophenol.

Other examples of the electron donor (a) include aromatic polyvalent carboxylic acid esters such as phthalic acid esters. More specifically, alkyl phthalates such as ethyl phthalate, n-butyl phthalate, isobutyl phthalate, hexyl phthalate or heptyl phthalate are preferable, and diisobutyl phthalate is more preferable.

Among these, ethers are preferable for the electron donor (a) and compounds used particularly preferably are isoamyl ethers. Two or more types of these electron donors (a) can be mixed or used in combination.

(Electron Acceptor (b) Used to Produce Solid Titanium Catalyst Component (I))

The electron acceptor (b) is preferably a halide of an element of groups 3 to 6 or groups 13 to 16 of the periodic table. Specific examples thereof include anhydrous aluminum chloride, silicon tetrachloride, stannous chloride, stannic chloride, titanium tetrachloride, zirconium tetrachloride, phosphorous trichloride, phosphorous pentachloride, vanadium tetrachloride and antimony pentachloride. Two or more types of these compounds can also be used after mixing. Among the aforementioned compounds, titanium tetrachloride is most preferable.

A catalyst that allows the obtaining of an olefin polymer having a broad molecular weight distribution and high stereoregularity can also be used for the solid titanium catalyst component (I) of the present invention in addition to that obtained according to the aforementioned production method.

(Method for Preparing Olefin-Type Polymerization Catalyst)

The olefin-type polymerization catalyst of the present invention can be obtained by combining prescribed amounts of the solid titanium catalyst component (I) obtained in the aforementioned step (1), the organometallic catalyst component (II), and as necessary, an electron donor (III).

In the present invention, the aforementioned olefin-type polymerization catalyst is preferably an olefin-type polymerization catalyst containing the solid titanium catalyst component (I), the organometallic catalyst component (II) and the electron donor (III).

In the olefin-type polymerization catalyst of the present invention, 0.1 g to 500 g of the organometallic catalyst component (II) is used with respect to 1 g of the solid titanium catalyst component (I) in combination therewith.

(Organometallic Catalyst Compound Component (II) Used as Olefin-Type Polymerization Catalyst)

A compound containing a group 13 metal such as an organic aluminum compound, a complex alkylate of a group 1 metal and an alkyl aluminum compound, or an organometallic compound of a group 2 metal, for example, can be used for the organometallic catalyst component (II) that forms the olefin-type polymerization catalyst in combination with the aforementioned solid titanium catalyst component (I). Among these, the use of an organic aluminum compound is preferable.

More specifically, organometallic compound catalyst components described in the known literature such as EP585869A1 are listed as preferable examples of the aforementioned organometallic compound catalyst component (II).

Specific preferable examples of the organometallic compound catalyst component (II) include trialkyl aluminum compounds such as trimethyl aluminum, triethyl aluminum, tributyl aluminum or trioctyl aluminum, and halogen-containing alkyl aluminum compounds such as diethyl aluminum chloride, dibutyl aluminum chloride, ethyl aluminum sesquichloride or ethyl aluminum dichloride. Among these, halogen-containing alkyl aluminum compounds are preferable, and diethyl aluminum chloride, dibutyl aluminum chloride and ethyl aluminum sesquichloride are more preferable.

(Electron Donor (III) Used as Olefin-Type Polymerization Catalyst)

The olefin-type polymerization catalyst preferably used in the present invention may contain the electron donor (III) together with the aforementioned organometallic compound catalyst component (II) as necessary. Preferable examples of the electron donor (III) are the same as those listed as examples of the aforementioned electron donor (a).

In addition, aromatic polycarboxylic acid esters can be used for the electron donor (III), examples of which include aromatic monocarboxylic acid esters such as ethyl benzoate, propyl benzoate, butyl benzoate, octyl benzoate, 2-ethylhexyl benzoate, methyl toluylate, ethyl toluylate, 2-ethylhexyl toluylate, methyl anisate, ethyl anisate, propyl anisate, ethyl cinnamate, methyl naphthoate, propyl naphthoate, butyl naphthoate, 2-ethylhexyl naphthoate or ethylphenyl acetate, and aromatic polycarboxylic acid esters such as phthalic acid esters.

The catalyst of the present invention for use as the olefin-type polymerization catalyst of the present invention is more preferably obtained by preliminarily activating by reacting with an α-olefin followed by adding the aforementioned ester.

An organic silicon compound can be used for the electron donor (III) in addition to the aforementioned compounds. A compound represented by the following general formula (4) can be used for this organic silicon compound:

$$R_nSi(OR')_{4-n} \quad (4)$$

(In the above formula, R and R' represent hydrocarbon groups, and n is an integer of 0<n<4).

Specific examples of organic silicon compounds represented by general formula (4) as described above include diisopropyldimethoxysilane, t-butylmethyldimethoxysilane, t-butylmethyldiethoxysilane, t-amylmethyldiethoxysilane, dicyclohexyldimethoxysilane, cyclohexylmethyldimethoxysilane, cyclohexylmethyldiethoxysilane, vinyltrimethoxysilane, vinyltriethoxysilane, t-butyltriethoxysilane, phenyltriethoxysilane, cyclohexyltrimethoxysilane, cyclopentyltrimethoxysilane, 2-methylcyclopentyltrimethoxysilane, cyclopentyltriethoxysilane, dicyclopentyldimethoxysilane, dicyclopentyldiethoxysilane, tricyclopentylmethoxysilane, dicyclopentylmethylmethoxysilane, dicyclopentylethylmethoxysilane and cyclopentyldimethylethoxysilane.

Among these, vinyltriethoxysilane, diphenyldimethoxysilane, dicyclohexyldimethoxysilane, cyclohexylmethyldimethoxysilane and dicyclopentyldimethoxysilane are used preferably.

In addition, a silane compound represented by the following formula (5) described in International Publication No. WO 2004/016662 can also be preferably used for the electron donor (III) of the present invention.

$$Si(OR_a)_3(NR_bR_c) \quad (5)$$

In the above formula (5), $R_a$ represents a hydrocarbon group having 1 to 6 carbon atoms, examples of $R_a$ include unsaturated or saturated aliphatic hydrocarbon groups having 1 to 6 carbon atoms, and hydrocarbon groups having 2 to 6 carbon atoms are particularly preferable. Specific examples thereof include a methyl group, ethyl group, n-propyl group, isopropyl group, n-butyl group, isobutyl group, sec-butyl group, n-pentyl group, isopentyl group, cyclopentyl group, n-hexyl group and cyclohexyl group, and among these, an ethyl group is particularly preferable.

In formula (5), $R_b$ represents a hydrocarbon group having 1 to 12 carbon atoms or a hydrogen atom. Examples of $R_b$ include unsaturated aliphatic hydrocarbon groups or saturated aliphatic hydrocarbon groups having 1 to 12 carbon atoms and a hydrogen atom. Specific examples thereof include a hydrogen atom, methyl group, ethyl group, n-propyl group, isopropyl group, n-butyl group, isobutyl group, sec-butyl group, n-pentyl group, isopentyl group, cyclopentyl group, n-hexyl group, cyclohexyl group and octyl group, and among these, an ethyl group is particularly preferable.

In formula (5), $R_c$ represents a hydrocarbon group having 1 to 12 carbon atoms or a hydrogen atom. Examples of $R_c$ include unsaturated aliphatic hydrocarbon groups or saturated aliphatic hydrocarbon groups having 1 to 12 carbon atoms and a hydrogen atom. Specific examples thereof include a methyl group, ethyl group, n-propyl group, isopropyl group, n-butyl group, isobutyl group, sec-butyl group, n-pentyl group, isopentyl group, cyclopentyl group, n-hexyl group, cyclohexyl group and octyl group, and among these, an ethyl group is particularly preferable.

Specific examples of compounds represented by the aforementioned formula (5) include: dimethylaminotriethoxysilane, diethylaminotrimethoxysilane, diethylaminotriethoxysilane, diethylaminotri-n-propoxysilane, di-n-propylaminotriethoxysilane, methyl-n-propylaminotriethoxysilane, t-butylaminotriethoxysilane, ethyl-n-propylaminotriethoxysilane, ethylisopropylaminotriethoxysilane and methylethylaminotriethoxysilane.

In addition, other examples of the aforementioned organic silicon compounds used for the electron donor (III) include compounds represented by the following formula (6):

$$RNSi(OR_a)_3 \quad (6)$$

(In formula (6), RN represents a cyclic amino group and $R_a$ represents an alkyl group).

Examples of the aforementioned cyclic amino group include a perhydroquinolino group, perhydroisoquinolino group, 1,2,3,4-tetrahydroquinolino group, 1,2,3,4-tetrahydroisoquinolino group and octamethyleneimino group.

Specific examples of compounds represented by the aforementioned formula (6) include:
(perhydroquinolino)triethoxysilane, (perhydroisoquinolino)triethoxysilane, (1,2,3,4-tetrahydroquinolino)triethoxysilane, (1,2,3,4-tetraisoquinolino)triethoxysilane and octamethyleneiminotriethoxysilane.

Two or more types of these organic silicon compounds can also be used in combination. In addition, preferable examples of other useful compounds used for the electron donor (III) include so-called polyether compounds in the form of compounds having two or more ether bonds through a plurality of carbon atoms. Examples of such compounds are disclosed in, for example, Japanese Unexamined Patent Application, First Publication No. H4-218507.

Among these polyether compounds, 1,3-diethers are preferable, while 2-isopropyl-2-isobutyl-1,3-dimethoxypropane, 2,2-diisobutyl-1,3-dimethoxypropane, 2-isopropyl-2-isopentyl-1,3-dimethoxypropane, 2,2-dicyclohexyl-1,3-dimethoxypropane and 2,2-bis(cyclohexylmethyl)-1,3-dimethoxypropane are particularly preferable.

These compounds can be used alone or two or more types can be used in combination.

In the present invention, aromatic carboxylic acid esters are particularly preferably used for the electron donor (III).

Namely, in the present invention, the aforementioned olefin-type polymerization catalyst is particularly preferably an olefin-type polymerization catalyst containing the aforementioned solid titanium catalyst component (I), the organometallic compound catalyst component (II), and an aromatic carboxylic acid ester.

Furthermore, the aforementioned olefin-type polymerization catalyst may also contain other components as necessary that are useful for olefin polymerization in addition to each of the components described above. Examples of these other components include an inorganic oxide support such as silica, antistatic agent, particle aggregating agent and storage stabilizer. However, in the case of using a resin obtained from the aforementioned olefin-type polymerization catalyst as a capacitor film, use of an inorganic oxide such as silica is preferably avoided as much as possible.

The polypropylene raw material resin according to the present invention is preferably obtained by polymerizing propylene alone in the presence of an olefin-type polymerization catalyst like that described above.

According to the method for producing a polypropylene raw material resin using the aforementioned olefin-type polymerization catalyst, polypropylene having a broad molecular weight distribution can be obtained by polymerizing in a low number of polymerization stages, such as by single-stage polymerization, without having to carry out multistage polymerization. In particular, polypropylene raw material resin is obtained that has a comparatively high ratio of components having a high molecular weight and a high ratio of components having a low molecular weight in comparison with olefin polymers using a conventional solid titanium catalyst containing titanium, magnesium and halogen and having an equal melt flow rate (to also be referred to as "MFR"). This characteristic can be confirmed by measuring by gel permeation chromatography (GPC) to be subsequently described. Namely, a polypropylene raw material resin can be obtained that has high values for both the value of weight average molecular weight (Mw)/number average molecular weight (Mn) and Z average molecular weight (Mz)/number average molecular weight (Mn) that represent molecular weight distribution.

<Polypropylene Resin that Forms Biaxially Stretched Polypropylene Film>

The biaxially stretched polypropylene film of the invention of the present application can be obtained by molding a polypropylene raw material resin obtained with the aforementioned olefin-type polymerization catalyst into a cast sheet and carrying out biaxial stretching on the aforementioned cast sheet.

The polypropylene resin that forms the film of the present invention has a weight average molecular weight (Mw) of 250,000 to 450,000 and preferably 250,000 to 400,000 as measured by gel permeation chromatography (GPC). Molecular weight distribution as calculated from the ratio of weight average molecular weight (Mw)/number average molecular weight (Mn) obtained by GPC is preferably 7 to 12, more preferably 7.5 to 12 and even more preferably 7.5 to 11. Moreover, molecular weight distribution as calculated from the ratio of Z average molecular weight (Mz)/number average molecular weight (Mn) is preferably 20 to 40, more preferably 20 to 30 and even more preferably 25 to 30. Here, a "polypropylene resin" refers to a polypropylene resin that forms a biaxially stretched polypropylene film formed by molding the aforementioned polypropylene raw material resin into a cast sheet and carrying out biaxial stretching on the aforementioned cast sheet.

In the polypropylene resin that forms the film of the present invention, if the weight average molecular weight exceeds 450,000, resin fluidity decreases considerably and it becomes difficult to control the thickness of the cast sheet. As a result, since it is no longer possible to achieve an object of the present invention in the form of producing an extremely thin stretched film having a thickness of 1 μm to 6 μm with favorable accuracy in the direction of thickness, this is not preferable in terms of practical use. In addition, in the case the weight average molecular weight of the polypropylene resin is less than 250,000, although moldability by extrusion molding is favorable, in addition to increased susceptibility to the occurrence of uneven sheet and film thickness, dynamic properties, thermal properties and mechanical properties of the resulting sheet decrease and stretchability decreases considerably resulting in problems in terms of production in that biaxial stretch molding can no longer be carried out, as well as product quality, thereby making this undesirable. Namely, in the biaxially stretched polypropylene film of the present invention, if the weight average molecular weight of the polypropylene resin that forms the aforementioned film is 250,000 to 450,000, the thickness of the cast sheet can be controlled without causing decreases in resin fluidity or film stretchability, and an extremely thin stretched film having a film thickness of 1 μm to 6 μm can be accurately produced, thereby making this preferable.

In particular, a polymer having a high Mz/Mn ratio is obtained by carrying out polymerization of propylene using the aforementioned olefin-type polymerization catalyst.

Polypropylene raw material resins having a broad molecular weight distribution, namely a high Mw/Mn value, are commonly recognized as having superior moldability and rigidity among persons with ordinary skill in the art. On the other hand, a high Mz/Mn ratio indicates a high content ratio of high molecular weight components, which is thought to be advantageous for further improvement of stretchability and the formation of β crystals.

Since the polypropylene raw material resin polymerized using the aforementioned olefin-type polymerization catalyst has a high Mz/Mn value without carrying out multistage polymerization, it is thought to have a high content ratio of high molecular weight components, and those high molecular weight components are thought to be dispersed in the polypropylene raw material resin at the catalytic level, namely at the nanometer level. Consequently, uniformity of the internal structure thereof increases further, which is thought to be advantageous for further improving stretchability and forming β crystals.

There are no particular restrictions on the apparatus of the gel permeation chromatograph (GPC) for obtaining measured values of weight average molecular weight and molecular weight distribution of the polypropylene resin that forms the biaxially stretched polypropylene film, and a commonly commercially available high-temperature GPC system capable of molecular weight analysis of polyolefins can be used, such as the HLC-8121GPC-HT high-temperature GPC analyzer with built-in differential refractometer (RI) manufactured by TOSOH CORPORATION. Specific measurement conditions consist of the use of three coupled TSKgel GMHHR-H(20)HT columns for use as GPC columns. In addition, measurements are carried out by setting the column temperature to 140° C., using trichlorobenzene for the eluent, and setting the flow rate to 1.0 ml/min. Standard polystyrene available from TOSOH CORPORATION is used to prepare the calibration curve, and measurement results are converted to polypropylene values. Logarithmic values of weight average molecular weight obtained in this manner are referred to as logarithmic molecular weight "Log (M)".

Moreover, simultaneous to being required to have the aforementioned ranges of weight average molecular weight and molecular weight distribution, the polypropylene resin that forms the biaxially stretched polypropylene film for a capacitor of the present invention also requires that the value obtained by subtracting a differential distribution value when the logarithmic molecular weight Log (M)=6 from a differential distribution value when Log (M)=4.5 on a molecular weight distribution curve thereof with respect to the differential value when Log (M)=4.5 is 8% to 20%, preferably 12% to 18% and more preferably 16% to 18%. This means that the composition thereof is such that the distribution value when the logarithmic molecular weight Log (M) is between 4 and 5, or in other words, when it is on the low molecular weight side of the weight average molecular weight, namely components having a weight average molecular weight of 10,000 to 100,000 (to be referred as "low molecular weight components") are high to a certain degree in comparison with being on the high molecular weight side of the weight average molecular weight, or in other words, when Log (M) is about 6, namely components having a weight average molecular weight of about 1,000,000 (to be referred to as "high molecular weight components") (see FIG. 1). In the present invention, the differential distribution value when Log(M)=4.5 was used as a representative value of low molecular weight components, while the differential distribution value when Log(M)=6 was used as a representative value of high molecular weight components.

In other words, even if the molecular weight distribution Mw/Mn is 7 to 12, since this value merely represents the width of molecular weight distribution, the composition status of high molecular weight components and low molecular weight components therein cannot be determined. Therefore, in the present aspect, both stretchability and withstand voltage property are realized by enabling the molecular weight composition of the polypropylene resin that forms the biaxially stretched polypropylene film for a capacitor of the present invention to have a broad molecular weight distribution while simultaneously having a molecular weight distribution that contains components having a weight average molecular weight of 10,000 to 100,000 at a certain constant ratio or more with respect to components having a weight average molecular weight of 1,000,000.

Since the polypropylene resin that forms the biaxially stretched polypropylene film for a capacitor of the present invention is required to have a composition of low molecular weight components that is higher than the composition of high molecular weight components, the value obtained by subtracting the differential distribution value when Log (M)=6 on the high molecular weight side of the weight average molecular weight from the differential distribution value when Log(M)=4.5 on the low molecular weight side of the weight average molecular weight is required to be positive, and that value is required to be 8% or more with respect to the differential distribution value when Log(M)=4.5. However, if this difference exceeds 20%, since the amount of low molecular weight components becomes excessively large, problems occur with respect to film formability and mechanical heat resistance, thereby making this undesirable in terms of practical use.

The aforementioned differential distribution values can generally be measured by GPC in the manner described below. A time curve (typically referred to as an elution curve) of intensity distribution as detected with a GPC differential refractometer (RI detector) is used as a distribution curve with respect to logarithmic molecular weight (Log(M)) using a calibration curve obtained from a substance having a known molecular weight. Here, since RI detected intensity is in a proportional relationship with component concentration, an integral distribution curve with respect to logarithmic molecular weight Log (M) can be obtained in the case of assigning a value of 100% to the total area of the distribution curve. A differential distribution curve can then be obtained by differentiating this integral distribution curve for Log(M). Thus, "differential distribution" in the present invention refers to the differential distribution of concentration percentage with respect to molecular weight. The relationship according to the present aspect can be obtained from this curve by reading the differential distribution value for a specific Log(M).

Although high withstand voltage property is able to be realized in the prior art by increasing the value of stereoregularity (crystallinity), this alone still results in a decrease in stretchability and difficulty in obtaining an extremely thin film. Increased withstand voltage property and stretchability can be imparted by adjusting the weight average molecular weight, molecular weight distribution, and composite ratio between high molecular weight components and low molecular weight components of the polypropylene resin that forms the biaxially stretched polypropylene film so as to fall within the aforementioned ranges.

In the biaxially stretched polypropylene film of the present invention, in the composition of the molecular weight distribution of the polypropylene resin that forms the aforementioned film, components having a weight average molecular weight of about 31,600 (Log(M)=4.5), in which the weight average molecular weight is on the low molecular weight side, are present in a larger amount than components having a weight average molecular weight of 1,000,000 (Log(M)=6), in which the weight average molecular weight is on the high molecular weight side. In a film having nearly the same stereoregularity and molecular weight distribution as the aforementioned polypropylene resin, a lower weight average molecular weight of the polypropylene resin is known to result in higher breakdown voltage, or in other words, better withstand voltage property. In this manner, the withstand voltage property of the biaxially stretched polypropylene film can be improved by having a larger amount of low molecular weight components present while maintaining molecular weight distribution, namely Mw/Mn and Mz/Mn, within the aforementioned ranges.

The polymerization method used to produce the polypropylene raw material resin for producing the polypropylene biaxially oriented film of the present invention is not limited to the aforementioned preparation method, but rather a commonly known polymerization method can also be used without restriction. Examples of commonly known polymerization methods include vapor phase polymerization, block polymerization and slurry polymerization.

The method used to polymerize the polypropylene raw material resin of the present invention may be a single-stage (one-step) polymerization reaction using a single polymerization reactor or a multistage polymerization reaction using at least two or more polymerization reactors. Moreover, the polymerization method may also be that which is carried out by adding hydrogen or comonomer to the reactor as a molecular weight modifier.

In addition, examples of methods used to adjust the value of the difference obtained by subtracting the differential distribution value when Log (M)=6 on the high molecular weight side from the differential distribution value when Log (M)=4.5 of the polypropylene resin that forms the polypropylene biaxially stretched film of the present invention to be between 8% and 20% with respect to the differential distribution value when Log (M)=4.5 include a method for producing a polypropylene biaxially stretched film using a polypropylene raw material resin for which molecular weight has been adjusted by polymerization conditions, a method for producing a polypropylene biaxially stretched film using a polypropylene raw material resin in which high molecular weight components have been selectively subjected to decomposition treatment with a decomposing agent, and a method for producing a polypropylene biaxially stretched film using a polypropylene raw material resin in which resins having different molecular weights have been blended.

In the case of using a method for producing a polypropylene biaxially stretched film using a polypropylene raw material resin in which the composition of molecular weight distribution has been adjusted, if the aforementioned method for producing a polypropylene raw material resin using an olefin-type polymerization catalyst is used, molecular weight distribution and the composition of weight average molecular weight can be easily adjusted by a single-stage polymerization reaction, thereby making this preferable.

On the other hand, in the case of producing the film using a polypropylene raw material resin produced by a multistage polymerization reaction, the polypropylene raw material resin can be produced according to a method like that described below.

Polymerization is carried out at a high temperature using a plurality of reactors consisting of a high molecular weight polymerization reactor and a low molecular weight or intermediate molecular weight polymerization reactor. High molecular weight components and low molecular weight components of the formed resin can be adjusted regardless of the order of reactors. First, in a first polymerization step, the raw material in the form of propylene and a catalyst are supplied to a first polymerization reactor. A molecular weight modifier in the form of hydrogen is mixed with these components in an amount required to attain a required polymer molecular weight. In the case of slurry polymerization, for example, the reaction temperature is preferably about 70° C. to 100° C. and the residence time is preferably about 20 minutes to 100 minutes. The plurality of reactors can be used while connected in series, for example, and in that case, the polymerization product of the first step is continuously sent to the next reactor together with additional propylene, catalyst and molecular weight modifier. Continuing, a second polymerization is carried out to prepare a mixture having a lower weight average molecular weight or higher weight average molecular weight than the polymerization product of the first polymerization step. The composition of high molecular weight components and low molecular weight components can be adjusted by adjusting the yield (production output) of the first and second reactors.

The aforementioned olefin-type polymerization catalyst according to the present invention is preferably used for the catalyst. In addition, a co-catalyst component or donor may also be contained. Molecular weight distribution can be controlled by suitably adjusting the catalyst and polymerization conditions, thereby making this preferable.

In the case of using a method for producing a polypropylene biaxially stretched film using a polypropylene raw material resin in which molecular weight distribution has been adjusted by peroxide decomposition, a polypropylene raw material resin is preferably used for which molecular weight distribution of the polypropylene raw material resin has been adjusted by subjecting to peroxide treatment with a decomposing agent such as hydrogen peroxide or an organic peroxide.

When a peroxide is added to a disintegrating-type polymer in the manner of polypropylene, a reaction that extracts hydrogen from the polymer occurs, and although a cross-linking reaction also occurs by which a portion of the resulting polymer radicals recombine, nearly all of the radicals are known to undergo secondary decomposition (β cleavage) and divide into two polymers having a lower molecular weight. Thus, decomposition proceeds from high molecular weight components at a high probability, and as a result thereof, low molecular weight components increase and the composition of molecular weight distribution can be adjusted. An example of a method for obtaining a polypropylene raw material resin containing a suitable amount of low molecular weight components by peroxide decomposition is described below.

Polymer powder or pellets of a polypropylene raw material resin obtained by polymerization and an organic peroxide such as 1,3-bis(tertiary-butylperoxideisopropyl)-benzene are added and adjusted to about 0.001% by weight to 0.5% by weight with respect to the total weight of the polypropylene raw material resin while taking into consideration the target composition of high molecular weight components and low molecular weight components. A polypropylene raw material resin having a target molecular weight distribution can be obtained by melting and kneading the polymer powder or pellets of the polypropylene raw material resin having the target composition at about 180° C. to 300° C. with a melt-kneader.

In the case of using a method for producing a polypropylene biaxially stretched film using a polypropylene raw material resin for which the content of low molecular weight components has been adjusted by blending (resin mixing), a polypropylene raw material resin is preferably used that has been obtained by mixing while dry or after melting at least two or more types of raw material resins having different molecular weights.

In general, a mixed system of two types of polypropylenes, obtained by mixing with a primary resin (A) an added resin (B), having a weight average molecular weight either higher than or lower than the primary resin (A), at about 1% by weight to 40% by weight with respect to the total weight of the primary resin (A), is preferably used for the polypropylene raw material resin. The aforementioned polypropylene mixed system is preferable since it facilitates adjustment of the amount of low molecular weight components.

In addition, in the case of using the aforementioned adjustment by mixing, average molecular weight of the resin can also be measured according to MFR. In this case, making the difference between MFR values of the primary resin (A) and added resin (B) to be about 1 g/10 min to 30 g/10 min is preferable from the viewpoint of greater convenience during adjustment.

Although there are no particular limitations on the method used to mix the polypropylene raw material resin (A) and the added resin (B) having different molecular weights, a method consisting of dry-blending polymer powder or pellets using a mixer and the like, or a method consisting of supplying polymer powder or pellets of the primary resin (A) and the added resin (B) to a kneader followed by melting and kneading to obtain a blended resin, may be used.

There are no particular limitations on the mixer or kneader used, and a single-screw type, two-screw type or multi-screw type having a larger number of screws may be used. Moreover, in the case of using a type having two or more screws, the type of kneading may be that in which the screws rotate in the same direction or different directions.

In the case of blending by melting and kneading, although there are no particular limitations on the kneading temperature provided favorable kneading is obtained, in general, it is within a range of 200° C. to 300° C. and preferably 230° C. to 270° C. If the kneading temperature exceeds 300° C., this may lead to deterioration of the resin, thereby making this undesirable. In order to inhibit resin deterioration during kneading and mixing, the kneader may be purged with an inert gas such as nitrogen. Mixed polypropylene raw material resin pellets can be obtained by pelletizing the molten kneaded resin to a suitable size using a commonly known pelletizer.

The total ash content attributable to polymerization catalyst residue and the like contained in the biaxially stretched polypropylene film of the present invention is preferably as low as possible in order to improve electrical characteristics, and is 50 ppm by weight or less and preferably 40 ppm by weight or less with respect to the total weight of the polypropylene film.

According to the aforementioned methods, the value of the difference obtained by subtracting the differential distribution value when Log (M)=6 on the high molecular weight side from the differential distribution value when Log (M)=4.5 of the polypropylene resin that forms the polypropylene biaxially stretched film of the present invention can be adjusted to between 8% and 20% with respect to the differential distribution value when Log(M)=4.5. The biaxially stretched polypropylene film for a capacitor of the present invention is preferably obtained by molding the polypropylene raw material resin, obtained by using the aforementioned olefin-type polymerization catalyst, into a film.

In addition, the biaxially stretched polypropylene film of the present invention is preferably a biaxially stretched polypropylene film for a capacitor having molecular properties such that, simultaneous to having a weight average molecular weight and molecular weight distribution as previously described, the polypropylene resin that forms the biaxially stretched polypropylene film of the present invention preferably has a mesopentad fraction ([mmmm]), which is the degree of stereoregularity as determined by high-temperature nuclear magnetic resonance (NMR), of 94% or more to less than 98% and more preferably 95% to 97%.

If the mesopentad fraction [mmmm] is 94% or more, resin crystallinity improves and high withstand voltage property is demonstrated due to components having high stereoregularity. On the other hand, if the mesopentad fraction [mmmm] is less than 94%, withstand voltage property and mechanical heat resistance tend to be inferior. In addition, if the mesopentad fraction (mmmm) is 98% or more, the solidification rate (crystallization rate) when molding a cast sheet becomes excessively fast, resulting in greater susceptibility to the occurrence of separation from the metal drum used for sheet molding and decreased stretchability. Namely, if the mesopentad fraction [mmmm] of the polypropylene resin that forms the biaxially stretched polypropylene film of the present invention is 94% or more to less than 98%, in addition to improved resin crystallinity and high withstand voltage property, the solidification rate when molding a cast sheet does not become excessively fast and there is less likelihood of separation from the metal drum used to mold the sheet, thereby making this preferable.

Here, "mesopentad fraction [mmmm]" refers to an indicator for determining the stereoregular content of five adjacent monomer units.

There are no particular restrictions on the high-temperature NMR system for measuring mesopentad fraction [mmmm], and an ordinary commercially available high-temperature nuclear magnetic resonance (NMR) system capable of measuring the stereoregularity of polyolefins can be used, such as the JNM-ECP500 high-temperature Fourier transform nuclear magnetic resonance system (high-temperature FT-NMR) manufactured by JEOL Ltd. The observed nucleus is $^{13}$C (125 MHz), the measuring temperature is 135° C., and ortho-dichlorobenzene (ODCB:mixed solvent of ODCB and deuterated ODCB (mixing ratio=4/1)) is used for the solvent. High-temperature NMR can be carried out using a known method such as the method described in "Polymer Analysis Handbook—New Edition, Japan Society for Analytical Chemistry, Research Committee of Polymer Analysis, KINOKUNIYA COMPANY LTD., 1995, p. 610".

The measurement mode is set to single-pulse proton broad band decoupling, the pulse width is 9.1 μsec (45° pulse), the pulse interval is 5.5 sec, the number of integrations is 4500, and CH$_3$ [mmmm]=21.7 ppm is used for the chemical shift reference.

Pentad fraction, which represents stereoregularity, is calculated as a percentage of the integrated value of the intensity of each signal derived from a combination of pentads (such as "mmmm" or "mrrm") arranged in the same direction (meso (m)) and arranged in different directions (racemo (r)). The assignment of each signal derived from "mmmm" or "mrrm" and the like can be determined by referring to the description of spectra in, for example, "T. Hayashi, et al., Polymer, Vol. 29, p. 138 (1988)".

In this manner, as a result of the polypropylene resin that forms the biaxially stretched polypropylene film for a capacitor of the present invention having a suitable content of the aforementioned low molecular weight components, or in other words, low molecular weight components having a weight average molecular weight of 10,000 to 100,000, stretchability can be imparted while maintaining high withstand voltage property without having extremely high stereoregularity in the manner of having a mesopentad fraction in excess of 98% as in the prior art.

The aforementioned mesopentad fraction ([mmmm]) can be controlled by suitably adjusting the aforementioned polymerization conditions, type of catalyst or amount of catalyst and the like.

In the present invention, the high-temperature withstand voltage property (breakdown strength) of the biaxially stretched polypropylene film refers to the alternating current breakdown strength determined by measuring the value of breakdown voltage by AC in accordance with JIS-C2330 (corresponding standard: IEC60674-3-1 1998), section 7.4.11.2 (breakdown voltage—plate electrode method: Method B) and the direct current breakdown strength determined by measuring the value of breakdown voltage by DC in accordance with JIS-C2330 7.4.11.2 (breakdown voltage—plate electrode method: Method B). In the present invention, "superior withstand voltage property" refers to a value of the aforementioned alternating current breakdown strength of 300 vac/μm or more, and a value of direct current breakdown strength of 480 Vdc/μm or more.

Short-term withstand voltage property (breakdown strength value) under high temperatures of the biaxially stretched polypropylene film for a capacitor of the present invention can be improved in this manner. However, on the market, and particularly in applications in the automobile industry as previously described, there is even greater demand for increasing the service life (long-term durability) of the film in the case of continuously being subjected to high voltage at high temperatures.

If a capacitor is continuously subjected to a high voltage at high temperatures as described above, spontaneous heat generation occurs within the film in the capacitor element, oxidation and thermal deterioration proceed with time, and as a result thereof, capacitor performance, or in other words, capacitor electrostatic capacitance, decreases.

Methods for evaluating long-term durability of a capacitor element (or capacitor film) in this manner are typically well known and consist of evaluating the service life (long-term durability) of a capacitor element (or capacitor film) by subjecting to a high-temperature, high-voltage load at a temperature and voltage that are higher than those during actual use. More specifically, a well-known method consists of recording the rate of change in electrostatic capacitance of a capacitor element over a long period of time (such as for 2000 hours, or about 80 days) in the case of continuously subjecting a capacitor element to a high direct current voltage (such as 600 V to 900 V) at an environmental temperature of 100° C. or higher (such as 105° C.)

Since a capacitor that uses a film having favorable long-term durability, namely long service life, without allowing the progression of deterioration undergoes little deterioration of the film even if subjected to a high voltage for 2000 hours as described above, there is little decrease in electrostatic capacitance. On the other hand, in the case of a capacitor that uses a film in which deterioration proceeds rapidly and long-term durability is inferior, electrostatic capacitance tends to decrease considerably with the passage of time.

In this manner, since long-term durability testing of capacitor films consists of evaluating the capacitor element according to the change in electrostatic capacitance in the case of continuously subjecting to a high temperature and high voltage as previously described for a prescribed amount of time (such as 2000 hours, or about 80 days), improvement of this change in electrostatic capacitance is an important technical requirement.

Here, long-term durability (change in electrostatic capacitance) of the film for a capacitor of the present invention refers to the rate of change in electrical capacitance between a first round of voltage loading and a fourth round of voltage loading as evaluated by subjecting the capacitor element to direct current voltage load of 1.0 kV for 1 minute in a high-temperature chamber at 105° C., measuring the capacitance of the element following completion of voltage loading with an LCR tester, returning the element to the high-temperature chamber, carrying out a second round of voltage loading, determining the second change in capacitance (cumulative), and repeating this procedure four times. In the present invention, "superior long-term durability" refers to a value of the fourth measured rate of change in electrical capacitance as measured according to the aforementioned procedure of −20% or less.

Moreover, the present invention also relates to a biaxially stretched polypropylene film for a capacitor that is capable of inhibiting deterioration over time during long-term use. More specifically, the present invention relates to a biaxially stretched polypropylene film for a capacitor characterized in that, an isotactic polypropylene that forms the aforementioned biaxially stretched polypropylene film contains at least one or more types of a hindered phenol-based antioxidant having a carbonyl group, and the residual content of the aforementioned hindered phenol-based antioxidant in the aforementioned film is 4000 ppm by weight to 6000 ppm by weight with respect to the total weight of the aforementioned film.

Examples of the aforementioned hindered phenol-based antioxidant having a carbonyl group used in the biaxially stretched polypropylene film for a capacitor of the present invention include triethylene glycol-bis[3-(3-tertiary-butyl-5-methyl-4-hydroxyphenyl) propionate] (trade name: Irganox 245, BASF Corp.), 1,6-hexanediol-bis[3-(3,5-di-tertiary-butyl-4-hydroxyphenyl) propionate] (trade name: Irganox 259, BASF Corp.), pentaerythrityl tetrakis[3-(3,5-di-tertiary-butyl-4-hydroxyphenyl) propionate (trade name: Irganox 1010, BASF Corp.), 2,2-thiodiethylenebis[3-(3,5-di-tertiary-butyl-4-hydroxyphen yl)proprionate (trade name: Irganox 1035, BASF Corp.), octadecyl-3-(3,5-di-tertiary-butyl-4-hydroxyphenyl) propionate (trade name: Irganox 1076, BASF Corp.), and N,N'-hexamethylenebis(3,5-di-tertiary-butyl-4-hydroxy-hydrocinnamide) (trade name: Irganox 1098, BASF Corp.). Among these, pentaerythrityl tetrakis[3-(3,5-tertiary-butyl-4-hydroxyphenyl) propionate is most preferable due to its high molecular weight, ample compatibility with polypropylene resin, low volatility and superior heat resistance.

The content of the hindered phenol-based antioxidant having a carbonyl group in the biaxially stretched polypropylene film for a capacitor of the present invention, namely the residual amount in the film, is 4000 ppm by weight to 6000 ppm by weight with respect to the total weight of the aforementioned film.

In the case the content of the hindered phenol-based antioxidant having a carbonyl group (residual amount in the film) is less than 4000 ppm by weight with respect to the total weight of the aforementioned film, the effect of inhibiting oxidative deterioration in a long-term lifetime test of the biaxially stretched polypropylene film is inadequate. Namely, the effect of improving long-term durability at high temperatures and high voltage, namely the effect of inhibiting decreases in electrostatic capacitance, is not adequately demonstrated, thereby making this undesirable. On the other hand, if the residual amount of hindered phenol-based antioxidant having a carbonyl group in the film exceeds 6000 ppm by weight with respect to the total weight of the aforementioned film, there are cases in which the antioxidant per se becomes a charge carrier (a type of impurity), and as a result thereof, current is generated at high voltages, and since phenomena leading to breakdown referred to as thermal runaway or rupture occur, long-term durability is conversely lost, thereby making this undesirable. The residual amount of the hindered phenol-based antioxidant having a carbonyl group in the film is more preferably 4500 ppm by weight to 6000 ppm by weight, and even more preferably 5000 ppm by weight to 6000 ppm by weight, with respect to the total weight of the aforementioned film.

A capacitor film, in which a hindered phenol-based antioxidant having a carbonyl group that has favorable compatibility with polypropylene resin at the molecular level is contained within the aforementioned optimum range, has superior long-term durability without undergoing a decrease in electrostatic capacitance (without allowing deterioration to proceed) over a long period of 1000 hours, namely 40 days or more, in an accelerated lifetime test at an extremely high temperature of 100° C. or higher while maintaining a high withstand voltage property (breakdown voltage value) obtained by adjusting molecular weight distribution as previously described.

A method for controlling the content of the hindered phenol-based antioxidant having a carbonyl group in the aforementioned film to within the aforementioned ranges is explained in the section on antioxidants to be subsequently described.

The molecular properties of the polypropylene resin that forms the biaxially stretched polypropylene film for a capacitor of the present invention (weight average molecular weight, molecular weight distribution, composition of molecular weight distribution and stereoregularity) indicate values of the resin that forms the film after going through a film formation step, and not values of the raw material resin per se for producing a film. During the course of the film formation step, the polypropylene resin that forms this film undergoes no small degree of thermal deterioration, oxidative deterioration, shear deterioration or elongation deterioration in an extruder, and decomposition progresses. Accompanying this, in many cases weight average molecular weight, molecular weight distribution and stereoregularity differ between the polypropylene raw material resin and the polypropylene resin that forms a film following film formation. The molecular properties of the polypropylene resin have a greater effect on the withstand voltage property and heat resistance of a film when in the state of a film.

The degree of progression of deterioration, namely changes in molecular weight distribution and stereoregularity, can be adjusted according to, for example, whether or not the inside of the extruder is purged with nitrogen (inhibition of oxidation), the shape of the screw in the extruder (shear force), the internal shape of the T-die during casting (shear force), the amount of antioxidant added (inhibition of oxidation) and the take-up speed during casting (elongation force).

Additives such antioxidants for inhibiting deterioration in the extruder, stabilizers such as a chlorine absorber or ultraviolet absorber, lubricants, plasticizers, flame retardants or antistatic agents can be added to the polypropylene raw material resin as necessary within a range that does not impair the effects of the present invention.

Antioxidants added to the polypropylene raw material resin are used that have at least the two purposes of antioxidants used for the purpose of inhibiting thermal deterioration or oxidative deterioration in the extruder (to also be referred to as "primary agents"), and antioxidants that inhibit deterioration during long-term use as a capacitor film and contribute to improvement of capacitor performance (to also be referred to as "secondary agents").

These primary and secondary agents may be respectively the same or different.

In the case of using different types of antioxidants for the primary and secondary agents, 2,6-di-tertiary-butyl-para-cresol (generic name: BHT), for example, can be added at about 1000 ppm by weight to 4000 ppm by weight with respect to the total weight of the polypropylene raw material resin for use as a primary agent for the purpose of inhibiting deterioration within the extruder. Antioxidant used for this purpose is nearly completely consumed in the molding step in the extruder, and hardly any remains in the film following film formation. Here, "hardly any remains" indicates that the residual amount of the aforementioned primary agent in the film is less than 100 ppm by weight with respect to the total weight of the polypropylene raw material resin.

An example of the secondary agent that inhibits deterioration during long-term use as a capacitor, which is an object of the present invention, and contributes to improvement of capacitor performance is a hindered phenol-based antioxidant having a carbonyl group.

Examples of hindered phenol-based antioxidants having a carbonyl group include triethylene glycol-bis[3-(3-tertiary-butyl-5-methyl-4-hydroxyphenyl) propionate] (trade name:

Irganox 245), 1,6-hexanediol-bis[3-(3,5-di-tertiary-butyl-4-hydroxyphenyl) propionate] (trade name: Irganox 259), pentaerythrityl tetrakis[3-(3,5-di-tertiary-butyl-4-hydroxyphenyl) propionate (trade name: Irganox 1010), 2,2-thiodiethylenebis[3-(3,5-di-tertiary-butyl-4-hydroxyphenyl)proprionate (trade name: Irganox 1035), octadecyl-3-(3, 5-di-tertiary-butyl-4-hydroxyphenyl) propionate (trade name: Irganox 1076), and N,N'-hexamethylenebis(3,5-di-tertiary-butyl-4-hydroxy-hydrocinnamide) (trade name: Irganox 1098). Among these, pentaerythrityl tetrakis[3-(3, 5-di-tertiary-butyl-4-hydroxyphenyl) propionate is most preferable due to its high molecular weight, ample compatibility with polypropylene resin, low volatility and superior heat resistance.

The amount added of the hindered phenol-based antioxidant having a carbonyl group is preferably within the range of 5000 ppm by weight to 7000 ppm by weight, and more preferably within the range of 5500 ppm by weight to 7000 ppm by weight, with respect to the total weight of the polypropylene raw material resin.

In order to make the residual amount of the hindered phenol-based antioxidant having a carbonyl group contained in the biaxially stretched polypropylene film for a capacitor according to the present invention in the film to be 4000 ppm by weight to 6000 ppm by weight with respect to the total weight of the aforementioned film, the added amount thereof is required to be within the aforementioned range. This is because the hindered phenol-based antioxidant having a carbonyl group is consumed to no small degree in the extruder regardless of the presence or absence of the primary agent used for the purpose of inhibiting deterioration in the extruder as previously described. The consumed amount of hindered phenol-based antioxidant having a carbonyl group in the extruder is normally about 1000 ppm by weight to 2000 ppm by weight with respect to the total weight of the polypropylene raw material resin.

Namely, if the added amount of hindered phenol-based antioxidant having a carbonyl group with respect to the total weight of the polypropylene raw material resin is less than 5000 ppm by weight, the residual amount of the aforementioned antioxidant in the biaxially stretched polypropylene film for a capacitor is less than 4000 ppm, thereby preventing the effect of improving long-term durability at high voltages from being adequately demonstrated. On the other hand, if the added amount of hindered phenol-based antioxidant having a carbonyl group is greater than 7000 ppm, the residual amount of the aforementioned antioxidant in the film exceeds 6000 ppm, the antioxidant per se becomes a charge carrier (a type of impurity), and long-term durability conversely tends to be lost as previously described.

In the case of not using the aforementioned antioxidant as a primary agent used for the purpose of inhibiting thermal deterioration or oxidative deterioration in the extruder, it can be substituted with a hindered phenol-based antioxidant having a carbonyl group as an antioxidant used for this purpose. In this case, since a considerable amount of hindered phenol-based antioxidant having a carbonyl group is consumed in order to inhibit deterioration in the extruder during the molding step, the amount of the aforementioned hindered phenol-based antioxidant added in the case of not using a primary agent is preferably 6000 ppm by weight to 7000 ppm by weight with respect to the total weight of the polypropylene raw material resin.

<Method for Molding Cast Sheet>

Various known methods can be employed for the method used to mold the cast sheet prior to stretching in order to produce the biaxially stretched polypropylene film of the present invention. For example, after supplying raw material pellets composed of polypropylene raw material resin pellets serving as raw material, dry-mixed polypropylene raw material pellets (and/or polymer powder) or mixed polypropylene raw material pellets prepared by melting and kneading in advance to an extruder, the pellets are melted by heating at 170° C. to 320° C. and passed through a filter followed by melting again by heating at 170° C. to 320° C., and preferably 200° C. to 300° C., and melt-extruding from a T-die. Subsequently, a method can be employed consisting of cooling and solidifying in at least one or more metal drums held at 80° C. to 140° C. followed by molding an unstretched cast sheet.

During molding of this sheet, as a result of holding the temperature of the group of metal drums at 80° C. to 140° C. and preferably 90° C. to 120° C., the percentage of β crystals of the polypropylene resin that forms the resulting cast sheet as determined by an X-ray method is 1% to 50% and preferably 5% or more to less than 30%. Furthermore, this value is the value when not containing a β crystal nucleating agent.

In the case the percentage of β crystals of the polypropylene resin that forms the cast sheet is excessively low, although capacitor properties such as withstand voltage property improve, since the film surface becomes smooth, processing suitability such as element winding tends to be inferior. However, if the aforementioned percentage of β crystals is within the aforementioned ranges, both capacitor properties and element winding processability can be adequately satisfied.

The aforementioned percentage of β crystals is a value obtained by measurement of X-ray diffraction intensity. This value is calculated according to the method described in "A. Turner-Jones, et al., Makromol. Chem., Vol. 75, p. 134 (1964)", and is normally referred to as the K value. Namely, the aforementioned percentage of β crystals represents the ratio of β crystals according to the sum of the heights of three diffraction peaks derived from α crystals and ratio of a single diffraction peak derived from β crystals.

Although there are no particular limitations on the thickness of the aforementioned cast sheet, it is normally 0.05 mm to 2 mm and preferably 0.1 mm to 1 mm.

<Method for Molding Biaxially Stretched Polypropylene Film>

The biaxially stretched polypropylene film for a capacitor of the present invention can be produced by carrying out stretching treatment on the aforementioned polypropylene cast sheet. Stretching is preferably biaxial stretching oriented along the two longitudinal and lateral axes. In addition, sequential biaxial stretching is preferable for the stretching method. Sequential biaxial stretching consists of first holding the cast sheet at a temperature of 100° C. to 160° C., passing the polypropylene cast sheet between rollers having different speeds, stretching by a factor of 3 to 7 in the machine direction and immediately cooling to room temperature. By suitably adjusting the temperature of this longitudinal stretching step, namely by holding at 100° C. to 160° C. as previously described, β crystals fuse and change to α crystals, and as a result thereof, surface irregularities are actualized in the film surface. Continuing, the aforementioned stretched film is guided to a tender, and after stretching by a factor of 3 to 11 in the lateral direction at a temperature of 160° C. to 185° C., the film is relaxed, solidified and wound. The wound film is subjected to aging treatment at a temperature of about 20° C. to 45° C. followed by cutting to a desired product width.

According to this stretching step, the film has superior mechanical strength and rigidity and surface irregularities are articulated resulting in a finely surface-roughened stretched film.

The surface of the film of the present invention is preferably imparted with suitable surface roughness that results in favorable capacitor properties while improving element winding suitability.

Namely, the present invention is further characterized in that it is finely surface-roughened so that the surface roughness of at least one side of the biaxially stretched polypropylene film has a center line average roughness (Ra) of 0.05 µm to 0.15 µm and a maximum height (Rz) of 0.5 µm to 1.5 µm.

If the values for Ra and Rz (formerly defined in JIS as Rmax) are large to a certain degree, the film slides suitably, is resistant to wrinkling during take-up and is resistant to the occurrence of lateral shifting in element winding processing during processing such as winding or unwinding and during capacitor processing. However, if these values are excessively large, problems with surface gloss, transparency and other problems in terms of practical use occur. In addition, decreases occur in weight and thickness in the capacitor due to an increase in the interlayer gap between films, which are undesirable since this leads to a decrease in withstand voltage property. Conversely, if the volume of protrusions is low and the surface of the film is smooth to a certain degree resulting in the values of Ra and Rz being somewhat small, although this is advantageous in terms of withstand voltage property, if the aforementioned volume of protrusions is low and Ra and Rz become excessively small, the film does not slide easily, wrinkles form easily during winding processing, and productivity decreases, thereby making this undesirable. In addition, fine wrinkles and the like lead to exacerbation of the withstand voltage property of the capacitor, thereby resulting in problems in terms of practical use.

Ra and Rz (formerly defined in JIS as Rmax) are measured using a common, widely used stylus type or non-contact type surface roughness tester and the like according to the method defined in, for example, JIS-B0601:2001 (corresponding standard: ISO4287 1997). There are no limitations on the device manufacturer or type. In studies conducted in the present invention, Ra and Rz (formerly defined in JIS as Rmax) were determined in compliance with the method defined in JIS-B0601:2001 with a Model AY-41 Surface Roughness Analyzer using the Model SE-30 Surface Roughness Measuring Instrument manufactured by Kosaka Laboratory Ltd. Although these values can be measured with either a contact method (stylus type using a diamond stylus and the like) or non-contact method (non-contact detection with laser light and the like), in the present invention, measurements were carried out using a contact method, and the reliability of those values was supplemented and compared using values obtained with a non-contact method as necessary.

Although various known types of surface roughening methods such as embossing or etching can be employed to impart fine surface irregularities to the film surface, among these, a surface roughening method that uses a technique that does not require the introduction of impurities and controls the formation ratio of β crystals is preferable. The formation ratio of β crystals of a polypropylene resin that forms a polypropylene film after stretching can typically be controlled with the casting temperature or casting speed. In addition, the roll temperature of the longitudinal stretching step can also be used to control the fusion/transformation ratio of β crystals, and a finely roughened surface can be obtained on the film surface by selecting the optimum production conditions for these two parameters of β crystal formation and fusion/transformation.

In the present invention, characteristic microcrystals are formed due to a change in the crystallization behavior of the polypropylene resin that forms the biaxially stretched polypropylene film as a result of low molecular weight components being within the range according to the present invention. Consequently, effects can also be obtained that are useful for the formation of β crystals in order to obtain fine surface irregularities on the film surface. In other words, spherulite size can be controlled from being excessively small and spherulite density can be controlled from being excessively large to adjust the formation ratio of β crystals by using the characteristic composition of molecular weight distribution according to the present invention without having to significantly alter the production conditions of the polypropylene raw material resin from conventional conditions. Consequently, the aforementioned surface roughness according to the present invention can be realized, and winding processing suitability can be effectively imparted without impairing other performance.

The present invention further relates to an ultrathin biaxially stretched polypropylene film for a capacitor characterized in that, the thickness of biaxially stretched polypropylene film is 1 µm to 6 µm, preferably 1.5 µm to 4 µm, more preferably 1.5 µm to 3.5 µm and even more preferably 1.8 µm to 3 µm.

In the present invention, thickness of the biaxially stretched polypropylene film refers to the value of thickness of the biaxially stretched polypropylene film as measured in compliance with JIS-C2330 using a micrometer in accordance with JIS B7502 1994 (corresponding standard: ISO3611 1978).

In the biaxially stretched polypropylene film for a capacitor of the present invention, corona discharge treatment may be carried out online or offline following completion of the stretching and thermal fixing step for the purpose of enhancing adhesive properties in a subsequent step such as a metal deposition processing step. Although a known method can be used for corona discharge treatment, treatment is preferably carried out in air, carbon dioxide gas, nitrogen gas or a mixed gas thereof for the atmospheric gas.

In addition to a hindered phenol-based antioxidant having a carbonyl group, a required stabilizer such as a chlorine absorber may also be added to the biaxially stretched polypropylene film for a capacitor of the present invention within a range that does not have an effect on capacitor properties, and a metallic soap such as calcium stearate is used preferably.

The total ash content contained in the biaxially stretched polypropylene film for a capacitor of the present invention is preferably as low as possible in order to improve electrical characteristics, and is 50 ppm by weight or less and preferably 40 ppm by weight or less with respect to the total weight of the polypropylene film.

In addition, the aforementioned properties of the biaxially stretched polypropylene film for a capacitor of the present invention (such as weight average molecular weight, molecular weight distribution, stereoregularity, film thickness, withstand voltage property, stretching performance, antioxidant content and surface roughness) refer to the properties of the polypropylene film obtained by biaxially stretching a cast sheet, namely the polypropylene film prior to a metallization step.

<Metallized Polypropylene Film for a Capacitor>

There are no particular limitations on the electrode when processing the biaxially stretched polypropylene film for a capacitor of the present invention as a capacitor, and although it is preferably metal foil or a paper or plastic film having at least one metallized side, in capacitor applications requiring even smaller size and lighter weight, an electrode in which one side or both sides of the film of the present invention is/are metallized directly is preferable. Namely, the metallized polypropylene film for a capacitor of the present invention can be obtained by metallizing at least one side of the biaxially stretched polypropylene film for a capacitor of the present invention. Zinc, lead, silver, chromium, aluminum, copper or nickel alone, or a mixture or alloy of a plurality of types thereof, can be used without any restrictions for the metal used to metallize one side or both sides of the film at this time. Among these, zinc and aluminum are used preferably in consideration of the environment, economy, capacitor performance and the like.

Although examples of a method for directly metallizing the biaxially stretched polypropylene film for a capacitor of the present invention include vacuum deposition and sputtering, there are no particular limitations thereon. Although examples of vacuum deposition typically include crucible methods and wire methods, there are no particular limitations thereon, and the optimum method may be suitably selected.

Although there are also no particular limitations on the margin pattern when metallizing by deposition, from the viewpoint of improving capacitor properties such as storage stability, a pattern containing a so-called special margin such as a fishnet pattern and/or T-margin pattern is preferable. In the case of forming this type of pattern on one surface of the film of the present invention, storage stability is enhanced, thereby also making this effective from the viewpoints of capacitor breakdown, prevention of short-circuiting and the like.

A commonly known method such as a tape method or oil method can be used without any restrictions for the method used to form the margin.

Since the surface of the biaxially stretched polypropylene film for a capacitor of the present invention is finely roughened, it has superior element winding suitability and high withstand voltage characteristics. In addition, since the film is an extremely thin film having a thickness of 1 μm to 6 μm, in addition to easily demonstrating high electrostatic capacitance, it also has superior long-term durability, thereby making it extremely preferable for use as a compact, high capacitance capacitor having capacitance of 5 μF or more, preferably 10 μF or more and even more preferably 20 μF or more.

EXAMPLES

Although the following provides a more detailed explanation of the present invention through examples thereof, the scope of the present invention is not limited thereto. In addition, the terms "parts" and "%" in the examples indicate "parts by weight" and "% by weight", respectively, unless specifically indicated otherwise.

[Characteristic Value Measurement Methods and Effect Evaluation Methods]

Methods used to measure characteristic values in each of the examples and methods used to evaluate effects are as described below.

(1) Measurement of Weight Average Molecular Weight (Mw), Molecular Weight Distribution (Mw/Mn, Mz/Mn) and Differential Distribution Values Evaluations of the molecular weight (Mw), molecular weight distribution (Mw/Mn, Mz/Mn) and differential distribution values of a distribution curve of the polypropylene resin that forms the biaxially stretched polypropylene film were carried out under the following conditions using gel permeation chromatography (GPC).

Measuring instrument: High-temperature GPC with built-in differential refractometer (RI), Tosoh Corp.

HLC-8121GPC-HT column: Three coupled TSKgel GMHHR-H(20)HT columns, TOSOH CORPORATION.

Column temperature: 140° C.

Eluent: Trichlorobenzene

Flow rate: 1.0 ml/min

The calibration curve was prepared using standard polystyrene manufactured by TOSOH CORPORATION, and the measurement results were converted to values for polypropylene.

Differential distribution values were obtained using the method described below.

First, a time curve (elution curve) of the distribution of intensity detected with an RI detector was used as a distribution curve with respect to weight average molecular weight (Log(M)) using the calibration curve. Next, after obtaining an integral distribution curve with respect to Log (M) in the case of assigning a value of 100% to the total area of the distribution curve, a differential distribution curve with respect to Log(M) was able to be obtained by differentiating for Log (M). Differential distribution values when Log (M)=4.5 and when Log(M)=6 were read from this differential distribution curve. Furthermore, the series of operations until the differential distribution curve was obtained can normally be carried out using analytical software provided in the GPC measurement system.

(2) Measurement of Mesopentad Fraction ([mmmm])

The polypropylene film was dissolved in the solvent indicated below followed by determination of mesopentad fraction ([mmmm]) under the following conditions using a high-temperature Fourier transform nuclear magnetic resonance (FT-NMR) system.

Measuring instrument: High-temperature FT-NMR JNM-ECP500, JEOL Ltd.

Observed nucleus: $^{13}$C (125 MHz)

Measuring temperature: 135° C.

Solvent: Ortho-dichlorobenzene (ODCB: mixed solvent of OCDB and deuterated OCDB (4/1))

Measurement mode: Single-pulse proton broad band decoupling

Pulse width: 9.1 μsec (45° pulse)

Pulse interval: 5.5 sec

Number of integrations: 4500

Chemical shift reference: $CH_3$ [mmmm]=21.7 ppm

Pentad fraction was calculated as a percentage of the integrated value of the intensity of each signal derived from a combination of pentads (such as "mmmm" or "mrrm"). The description of spectra in, for example, "T. Hayashi, et al., Polymer, Vol. 29, p. 138 (1988)" can be referred to regarding the assignment of each signal derived from "mmmm" or "mrrm" and the like.

(3) Evaluation of High-Temperature Withstand Property (Alternating Current Breakdown Strength) of Biaxially Stretched Polypropylene Film Withstand voltage property of the biaxially stretched polypropylene film obtained by test stretching was evaluate by measuring the breakdown voltage value by alternating current (AC) in compliance with JIS-C2330 7.4.11.2 (breakdown voltage —plate electrode method: Method B). Voltage was increased at the rate of 100 Vac/sec, the interrupting current during breakdown was 10 mA, and measurements were carried out 18 times. Here, the value obtained by dividing the average measured voltage value by the thickness of the film was used to evaluate breakdown strength. The film and an electrode jig were placed in an air-circulating high-temperature chamber and measured at an evaluation temperature of 100° C.

A high-temperature, alternating current breakdown strength of 300 Vac/μm or more can be said to be desirable.

(4) Evaluation of Film Thickness

Thickness (μm) of the biaxially stretched polypropylene film was measured in compliance with JIS-C2330 using a micrometer (JIS-B7502).

(5) Production Ease of Ultrathin Film

Productivity (stretching ease) when an ultrathin film is produced with production equipment was evaluated qualitatively in consideration of break frequency and the like during production (during film stretching). In the present invention, a film having a low break frequency was evaluated as a film having high ultrathin film productivity, while a film having high break frequency was evaluated as a film having low ultrathin film productivity.

(6) Measurement of Residual Amount of Antioxidant in Biaxially Stretched Polypropylene Film The biaxially stretched polypropylene film was cut followed by the addition of solvent to extract antioxidant remaining in the film by ultrasonic extraction.

The resulting extract was measured for the amount of secondary agent using high-performance liquid chromatography and an ultraviolet detector. The residual amount of secondary agent was calculated from the peak intensity of the resulting chromatograph using a preliminarily determined calibration curve.

(7) Measurement of Surface Roughness

Center line average roughness (Ra) and maximum height (Rz, formerly defined as Rmax in JIS) of the biaxially stretched polypropylene film were measured using the Model SE-30 Surface Roughness Measuring Instrument manufactured by Kosaka Laboratory Ltd., and determined in compliance with the method defined in JIS-B0601 with a Model AY-41 Surface Roughness Analyzer. Measurements were carried out three times and the average value thereof was used in evaluations. In the evaluations, measurements were carried out using a contact method, and the reliability of the values was supplemented and compared using values obtained with a non-contact method as necessary.

(8) Evaluation of High-Temperature Withstand Voltage Property (Direct Current Withstand Strength) of Biaxially Stretched Film The withstand voltage property of the biaxially stretched film was evaluated by measuring the breakdown voltage value using direct current (DC) in compliance with JIS-C2330, section 7.4.11.2 (breakdown voltage—plate electrode method: Method B). Voltage was increased at the rate of 100 Vdc/sec, the interrupting current during breakdown was 10 mA, and measurements were carried out 18 times. Here, the value obtained by dividing the average measured voltage value by the thickness of the film was used to evaluate breakdown strength. The film and an electrode jig were placed in an air-circulating high-temperature chamber and measured at an evaluation temperature of 100° C.

A breakdown strength of 480 Vdc/μm or more can be said to be desirable in terms of practical use.

(9) Evaluation of Suitability as Capacitor Film

Suitability as a capacitor film was comprehensively evaluated in consideration of reduction in thickness, surface refinement and high withstand voltage property at high temperatures. Preferable films were evaluated as "A", while those that were no different from those of the prior art were evaluated as "B".

(10) Production of Capacitor Element

A T-margin deposition pattern was formed on the biaxially stretched polypropylene film by aluminum deposition at a deposition resistance of 12Ω/I to obtain a metallized polypropylene film. After making slits having a narrow width therein, two metallized films were placed in mutual opposition and wound for 1150 turns at a take-up tension of 400 g using the Model 3KAW-N2 Automatic Winder manufactured by Kaido Mfg. Co., Ltd.

The wound element was then subjected to heat treatment for 6 hours at 120° C. while being pressed and the ends of the element were sprayed with zinc metal to obtain a flat capacitor. The electrostatic capacitance of the resulting capacitor was 100 μF (±5 μF).

(11) High-Temperature Withstand Voltage Test of Capacitor Element

A high-temperature withstand voltage test was carried out on the resulting capacitor element according to the procedure described below.

First, after preheating the element for 1 hour or more at the test temperature (105° C.), initial electrostatic capacitance prior to testing was evaluated with the LCR Hi-Tester 3522-50 manufactured by Hioki E. E. Corp. Next, the capacitor element was loaded with a direct current voltage of 1.0 kV for 1 minute using a high-voltage power supply in a high-temperature chamber at 105° C. Capacitance of the element following completion of voltage loading was measured with the LCR Hi-Tester followed by calculation of the rate of change in capacitance before and after voltage loading. Next, the element was returned to the high-temperature chamber and subjected to a second round of voltage loading followed by determining the second change in capacitance (cumulative) and repeating this four times. The rate of change in capacitance between the first time and the fourth time was used for evaluation.

A fourth rate of change in electrical capacitance of −20% or less can be said to be preferable in terms of practical use.

[Polymerization Catalyst: Preparation of Solid Titanium Catalyst Component (I)]

1.2 moles of diisoamyl ether (electron donor (a)) were added to 500 ml of purified n-heptane and 0.5 moles of diethyl aluminum chloride (organometallic compound catalyst component (II)) over the course of 2 minutes at 25° C. followed by holding at that temperature for 10 minutes (Reaction Liquid (I)).

After adding 4.0 moles of titanium tetrachloride to a 2-liter reactor of which the inside had been replaced with nitrogen and raising the temperature to 35° C., the aforementioned Reaction Liquid (I) was added thereto over the course of 3 hours followed by holding at that temperature for 30 minutes. Next, the temperature was raised to 75° C. followed by holding at that temperature for 1 hour.

The aforementioned liquid was cooled to room temperature and the supernatant was removed followed by adding 1 liter of purified n-heptane, allowing to stand undisturbed, removing the supernatant and repeating this so-called washing operation a total of 4 times.

100 g of the resulting solid were suspended in purified n-heptane followed by the addition of 80 g of isoamyl ether at 20° C. (electron donor (a)) and 180 g of titanium tetrachloride (electron acceptor (b)) over the course of 1 hour at room temperature and holding for 1 hour at 65° C. Subsequently, the liquid was gradually cooled to room temperature, and a washing operation consisting of removing the supernatant and adding 2 liters of purified n-heptane was repeated a total of 4 times to obtain the solid titanium catalyst component (II).

[Polymerization Example]

200 liters of propylene and 6200 NL of hydrogen were added to a polymerization reactor having an inner volume of 600 liters at room temperature followed by the addition of 100 millimoles of diethyl aluminum chloride (organometallic catalyst component (II)), 80 millimoles of methyl para-toluylate (electron donor (III)) and 15 millimoles of the solid titanium catalyst component (I) as titanium atoms, and rapidly raising the temperature inside the polymerization reactor to 70° C. After holding for 1 hour at 70° C., unreacted propylene was purged from the reactor followed by suspending in 200 liters of purified heptane in a nitrogen atmosphere. Subsequently, the aforementioned slurry was transferred to a different reactor containing a dry nitrogen atmosphere followed by the further addition of 80 liters of methanol and 400 milliliters of a 20% aqueous sodium hydroxide solution and stirring.

Following completion of stirring, the reactor was allowed to stand undisturbed, and after repeatedly washing with water after removing the aforementioned water-methanol phase, the heptane was filtered out and a washing operation using heptane was carried out. The resulting product was further dried overnight under reduced pressure at 80° C. to obtain polypropylene polymer granules.

[Polypropylene Resins]

Polypropylene Raw Material Resin A and Polypropylene Raw Material Resin B, in which the amount of low molecular weight components was adjusted by changing polymerization conditions, were obtained using the aforementioned solid titanium catalyst component (I).

In addition, for comparison purposes, Polypropylene Raw Material Resin C and Polypropylene Raw Material Resin D were obtained by suitably changing polymerization conditions using an olefin-type polymerization catalyst containing a known solid titanium catalyst component containing magnesium, chlorine, titanium and diisobutyl phthalate, but not containing the electron donor (III).

Moreover, the Polypropylene Raw Material Resin D was subjected to peroxide treatment to adjust the amount of low molecular weight components and obtain Polypropylene Raw Material Resin E.

In addition, the Polypropylene Raw Material Resin A was subjected to peroxide treatment to adjust the amount of low molecular weight components and obtain Polypropylene Raw Material Resin F.

Tables 1 and 2 indicate analytical values of polypropylene resins that form a film produced from these polypropylene raw material resins.

<Production Using Compact Laboratory Stretching Device>

Example 1

The Polypropylene Raw Material Resin A using the aforementioned solid titanium catalyst component (I) was supplied to an extruder, melted at a resin temperature of 250° C., extruded using a T-die, and wound onto a metal drum and solidified to produce a cast sheet having a thickness of about 250 μm. Continuing, after stretching this unstretched cast sheet by a factor of 5 in the machine direction at a temperature of 150° C. with a compact laboratory stretching device in the form of the KARO IV Laboratory Stretcher manufactured by Brückner GmbH, the sheet was immediately stretched in the transverse direction by a factor of 10 to obtain a thin biaxially stretched polypropylene film having a thickness of 5 μm. The molecular properties of the resulting film and film characteristic values are summarized in Table 1. Furthermore, the difference in molecular weight differential distribution values, molecular weight (Mw), molecular weight distribution (Mw/Mn, Mz/Mn) and mesopentad fraction shown in Table 1 are analytical values of the polypropylene resin that forms the film.

Example 2

A thin biaxially stretched polypropylene film having a thickness of 5 μm was obtained in the same manner as Example 1 with the exception of supplying the Polypropylene Raw Material Resin B having a different low molecular weight component content to the extruder instead of the Polypropylene Raw Material Resin A of Example 1. The molecular properties of the resulting film and film characteristic values are summarized in Table 1. Furthermore, the difference in molecular weight differential distribution values, molecular weight (Mw), molecular weight distribution (Mw/Mn, Mz/Mn) and mesopentad fraction shown in Table 1 are analytical values of the polypropylene resin that forms the film.

Comparative Example 1

A thin biaxially stretched polypropylene film having a thickness of 5 μm was obtained in the same manner as Example 1 with the exception of supplying the Polypropylene Raw Material Resin C obtained from a catalyst using diisobutyl phthalate to the extruder instead of the Polypropylene Raw Material Resin A of Example 1. The molecular properties of the resulting film and film characteristic values are summarized in Table 1. Furthermore, the difference in molecular weight differential distribution values, molecular weight (Mw), molecular weight distribution (Mw/Mn, Mz/Mn) and mesopentad fraction shown in Table 1 are analytical values of the polypropylene resin that forms the film.

Comparative Example 2

A thin biaxially stretched polypropylene film having a thickness of 5 μm was obtained in the same manner as Example 1 with the exception of supplying the Polypropylene Raw Material Resin D obtained from a catalyst using diisobutyl phthalate to the extruder instead of the Polypropylene Raw Material Resin A of Example 1. The molecular properties of the resulting film and film characteristic values are summarized in Table 1. Furthermore, the difference in molecular weight differential distribution values, molecular weight (Mw), molecular weight distribution (Mw/Mn, Mz/Mn) and mesopentad fraction shown in Table 1 are analytical values of the polypropylene resin that forms the film.

Comparative Example 3

A thin biaxially stretched polypropylene film having a thickness of 5 μm was obtained in the same manner as Example 1 with the exception of supplying the Polypropylene Raw Material Resin E, which was produced by subjecting Polypropylene Raw Material Resin D to peroxide treatment to adjust the amount of low molecular weight components, to the extruder instead of the Polypropylene Raw Material Resin A of Example 1. The molecular properties of the resulting film and film characteristic values are summarized in Table 1. Furthermore, the difference in molecular weight differential distribution values, molecular weight (Mw), molecular weight distribution (Mw/Mn, Mz/Mn) and mesopentad fraction shown in Table 1 are analytical values of the polypropylene resin that forms the film.

<Production of Ultrathin Film Using Production Equipment>

Example 3

Polypropylene Raw Material Resin A of Example 1 was supplied to an extruder, melted at a resin temperature of 250° C., extruded using a T-die, and wound onto a metal drum held at a surface temperature of 95° C. and solidified to produce a cast sheet having a thickness of about 125 μm. Continuing, after stretching this unstretched cast sheet by a factor of 5 in the machine direction at a temperature of 140° C. and immediately cooling to room temperature, the sheet was stretched in the transverse direction by a factor of 10 with a tender at 165° C. to obtain an extremely thin biaxially stretched polypropylene film having a thickness of 2.5 μm. The molecular properties of the resulting film and film characteristic values are summarized in Table 2. In addition, the withstand voltage properties of a capacitor element produced from the resulting biaxially stretched polypropylene film are summarized in Table 3. Furthermore, the difference in molecular weight differential distribution values, molecular weight (Mw), molecular weight distribution (Mw/Mn, Mz/Mn), mesopentad fraction and residual amount of secondary agent antioxidant shown in Table 2 are analytical values of the polypropylene resin that forms the film.

Example 4

An extremely thin biaxially stretched polypropylene film having a thickness of 2.5 μm was obtained in the same manner as Example 3 with the exception of supplying the Polypropylene Raw Material Resin F to the extruder instead of the Polypropylene Raw Material Resin A of Example 3. The molecular properties of the resulting film and film characteristic values are summarized in Table 2. In addition, the withstand voltage properties of a capacitor element produced from the resulting biaxially stretched polypropylene film are summarized in Table 3. Furthermore, the difference in molecular weight differential distribution values, molecular weight (Mw), molecular weight distribution (Mw/Mn, Mz/Mn), mesopentad fraction and residual amount of secondary agent antioxidant shown in Table 2 are analytical values of the polypropylene resin that forms the film.

Comparative Example 4

An extremely thin biaxially stretched polypropylene film having a thickness of 2.5 μm was obtained in the same manner as Example 3 with the exception of supplying the Polypropylene Raw Material Resin E to the extruder instead of the Polypropylene Raw Material Resin A of Example 3. The molecular properties of the resulting film and film characteristic values are summarized in Table 2. In addition, the withstand voltage properties of a capacitor element produced from the resulting biaxially stretched polypropylene film are summarized in Table 3. Furthermore, the difference in molecular weight differential distribution values, molecular weight (Mw), molecular weight distribution (Mw/Mn, Mz/Mn), mesopentad fraction and residual amount of secondary agent antioxidant shown in Table 2 are analytical values of the polypropylene resin that forms the film.

TABLE 1

| | Raw Material Resin | Presence of Cyclic Ester (Electron Donor (III)) | Difference in Differential Distribution Values (%) | Molecular Weight Mw/$10^4$ | Molecular Weight Distribution Mw/Mn | Molecular Weight Distribution Mz/Mn | Stereo-regularity (NMR) [mmmm] (%) | Thickness (μm) | Withstand Voltage Properties (Vac/μm) |
|---|---|---|---|---|---|---|---|---|---|
| Ex. 1 | Resin A | Present | 13.5 | 28 | 8.0 | 31.0 | 96.0 | 5.0 | 309 |
| Ex. 2 | Resin B | Present | 14.5 | 28 | 7.5 | 28.9 | 96.0 | 5.0 | 311 |
| Comp. Ex. 1 | Resin C | Absent | 8 | 27 | 6.5 | 16.5 | 96.5 | 5.0 | 280 |
| Comp. Ex. 2 | Resin D | Absent | 4 | 32 | 7.1 | 21.0 | 96.2 | 5.0 | 280 |
| Comp. Ex. 3 | Resin E | Absent | 11 | 25 | 6.7 | 17.1 | 96.5 | 5.0 | 295 |

TABLE 2

| | Raw Material Resin | Difference in Differential Distribution Values (%) | Molecular Weight Mw/$10^4$ | Molecular Weight Distribution Mw/Mn | Molecular Weight Distribution Mn/Mz | Stereo-regularity (NMR) [mmmm] (%) | Thickness (μm) | Residual amount of Secondary Agent (ppm) | Surface Roughness Ra (μm) | Surface Roughness Rz (μm) | Ultra-thin Film Productivity | Withstand Voltage Properties (Vdc/μm) | Capacitor element Suitability |
|---|---|---|---|---|---|---|---|---|---|---|---|---|---|
| Ex. 3 | Resin A | 13 | 28 | 8.4 | 32.0 | 96.0 | 2.5 | 4500 | 0.08 | 1.05 | High | 485 | A |
| Ex. 4 | Resin F | 18 | 25 | 7.5 | 25.0 | 96.0 | 2.5 | 5500 | 0.06 | 0.63 | High | 530 | A |
| Comp. Ex. 4 | Resin E | 11 | 26 | 6.3 | 15.0 | 96.5 | 2.5 | 4200 | 0.06 | 0.76 | Low | 465 | B |

TABLE 3

| | Element High-Temperature Withstand Voltage Property Rate of Change in Capacitance (%) (1st Voltage Loading) | Element High-Temperature Withstand Voltage Property Rate of Change in Capacitance (%) (4th Voltage Loading) | Evaluation of Withstand Voltage Property when Used as Capacitor |
|---|---|---|---|
| Example 3 | −0.5 | −15.6 | A |
| Example 4 | 0 | −0.5 | A |
| Comp. Ex. 4 | −5 | −69.8 | B |

As is clear from Examples 1, 2, 3 and 4, since the biaxially stretched polypropylene film of the present invention is a film that has a high breakdown voltage value, it is extremely preferable as a capacitor film having superior heat resistance performance and high withstand voltage performance.

However, in the case of the prior art, which has a narrow molecular weight distribution and a difference in differential distribution values (amount of low molecular weight components) that is outside the range of the present invention, breakdown voltage values were inferior (Comparative Example 1). Moreover, despite having a broad molecular weight distribution, if the difference in differential distribution values (amount of low molecular weight components) was outside the range of the present invention, breakdown voltage values were inferior (Comparative Example 2). Even if the polypropylene raw material resin of Comparative Example 1 was subjected to peroxide decomposition to increase the difference in differential distribution values (amount of low molecular weight components), although an effect was obtained that improved withstand voltage property, the result obtained was not adequately satisfactory (Comparative Example 3).

In the case of the biaxially stretched polypropylene film of the present invention, in contrast to easily allowing the obtaining of a film having a thickness of 2.5 μm while also being provided with high withstand voltage property and fine surface performance (Example 3), according to the prior art, in addition to numerous breaks during stretching making it difficult to easily obtain a film having a thickness of 2.5 μm, withstand voltage performance cannot be said to be adequate (Comparative Example 4).

INDUSTRIAL APPLICABILITY

Since the biaxially stretched polypropylene film of the present invention demonstrates high withstand voltage property (breakdown voltage value) at high temperatures, it is preferably used in a film capacitor. In addition, since the film is an extremely thin biaxially stretched film having a film thickness of 1 μm to 6 μm, it is particularly useful for use in compact, large-capacitance capacitors such as those used in automobile and electrical power applications requiring high voltage and heat resistance.

What is claimed is:

1. A biaxially stretched polypropylene film for a capacitor containing an isotactic polypropylene, wherein
the weight average molecular weight (Mw) of the isotactic polypropylene as measured by gel permeation chromatography (GPC) is 250,000 to 450,000,
the molecular weight distribution in terms of a ratio of weight average molecular weight (Mw)/number average molecular weight (Mn) is 7.5 to 12 and the molecular weight distribution in terms of a ratio of Z average molecular weight (Mz)/number average molecular weight (Mn) is 20 to 40, and
the value of a difference obtained by subtracting a differential distribution value when the logarithmic molecular weight Log(M)=6 from a differential distribution value when Log (M)=4.5 on a molecular weight distribution curve thereof is 8% to 20% with respect to the differential distribution value when Log(M)=4.5.

2. The biaxially stretched polypropylene film for a capacitor according to claim 1, wherein the isotactic polypropylene has stereoregularity in which a mesopentad fraction ([mmmm]) as determined by high-temperature nuclear magnetic resonance (high-temperature NMR) measurement is 94% or more to less than 98%.

3. The biaxially stretched polypropylene film for a capacitor according to claim 2, wherein the isotactic polypropylene contains at least one type of hindered phenol-based antioxidant having a carbonyl group, and the residual content of the hindered phenol-based antioxidant in the film is 4000 ppm by weight to 6000 ppm by weight with respect to the total weight of the film.

4. The biaxially stretched polypropylene film for a capacitor according to claim 2, wherein
the biaxially stretched polypropylene film is finely surface-roughened so that the surface roughness on at least one side thereof is such that the center line average roughness (Ra) is 0.05 μm and the maximum height (Rz) is 0.5 μm to 1.5 μm.

5. The biaxially stretched polypropylene film for a capacitor according to claim 2, wherein the thickness of the biaxially stretched polypropylene film is 1 μm to 6 μm.

6. The biaxially stretched polypropylene film for a capacitor according to claim 2, wherein the isotactic polypropylene is obtained by a method comprising:
obtaining a solid titanium catalyst component (I) by contacting an electron donor (a) and an electron acceptor (b) with a reaction product obtained by reacting an organometallic compound catalyst component (II) with titanium tetrachloride; and
obtaining an isotactic polypropylene by polymerizing propylene in the presence of an olefin-type polymerization catalyst containing the solid titanium catalyst component (I) and the organometallic compound catalyst component (II).

7. The biaxially stretched polypropylene film for a capacitor according to claim 1, wherein the isotactic polypropylene contains at least one type of hindered phenol-based antioxidant having a carbonyl group, and the residual content of the hindered phenol-based antioxidant in the film is 4000 ppm by weight to 6000 ppm by weight with respect to the total weight of the film.

8. The biaxially stretched polypropylene film for a capacitor according to claim 7, wherein
the biaxially stretched polypropylene film is finely surface-roughened so that the surface roughness on at least one side thereof is such that the center line average roughness (Ra) is 0.05 μm and the maximum height (Rz) is 0.5 μm to 1.5 μm.

9. The biaxially stretched polypropylene film for a capacitor according to claim 7, wherein the thickness of the biaxially stretched polypropylene film is 1 μm to 6 μm.

10. The biaxially stretched polypropylene film for a capacitor according to claim 7, wherein the isotactic polypropylene is obtained by a method comprising
obtaining a solid titanium catalyst component (I) by contacting an electron donor (a) and an electron acceptor (b) with a reaction product obtained by reacting an organometallic compound catalyst component (II) with titanium tetrachloride; and obtaining an isotactic polypropylene by polymerizing propylene in the presence of an olefin-type polymerization catalyst containing the solid titanium catalyst component (I) and the organometallic compound catalyst component (II).

11. The biaxially stretched polypropylene film for a capacitor according to claim 1, wherein the biaxially stretched polypropylene film is finely surface-roughened so that the surface roughness on at least one side thereof is such that the center line average roughness (Ra) is 0.05 µm to 0.15 µm and the maximum height (Rz) is 0.5 µm to 1.5 µm.

12. The biaxially stretched polypropylene film for a capacitor according to claim 11, wherein the thickness of the biaxially stretched polypropylene film is 1 µm to 6 µm.

13. The biaxially stretched polypropylene film for a capacitor according to claim 11, wherein the isotactic polypropylene is obtained by a method comprising:

obtaining a solid titanium catalyst component (I) by contacting an electron donor (a) and an electron acceptor (b) with a reaction product obtained by reacting an organometallic compound catalyst component (II) with titanium tetrachloride; and obtaining an isotactic polypropylene by polymerizing propylene in the presence of an olefin-type polymerization catalyst containing the solid titanium catalyst component (I) and the organometallic compound catalyst component (II).

14. The biaxially stretched polypropylene film for a capacitor according to claim 1, wherein the thickness of the biaxially stretched polypropylene film is 1 µm to 6 µm.

15. The biaxially stretched polypropylene film for a capacitor according to claim 14, wherein the isotactic polypropylene is obtained by a method comprising:

obtaining a solid titanium catalyst component (I) by contacting an electron donor (a) and an electron acceptor (b) with a reaction product obtained by reacting an organometallic compound catalyst component (II) with titanium tetrachloride; and obtaining an isotactic polypropylene by polymerizing propylene in the presence of an olefin-type polymerization catalyst containing the solid titanium catalyst component (I) and the organometallic compound catalyst component (II).

16. The biaxially stretched polypropylene film for a capacitor according to claim 1, wherein the isotactic polypropylene is obtained by a method comprising obtaining a solid titanium catalyst component (I) by contacting an electron donor (a) and an electron acceptor (b) with a reaction product obtained by reacting an organometallic compound catalyst component (II) with titanium tetrachloride; and obtaining an isotactic polypropylene by polymerizing propylene in the presence of an olefin-type polymerization catalyst containing the solid titanium catalyst component (I) and the organometallic compound catalyst component (II).

17. The biaxially stretched polypropylene film for a capacitor according to claim 16, wherein the solid titanium catalyst component (I) is obtained by reacting titanium tetrachloride with the reaction product of the organometallic compound catalyst component (II) and the electron donor (a) to obtain a further reaction product, and further contacting the electron donor (a) and the electron acceptor (b) with the further reaction product.

18. The biaxially stretched polypropylene film for a capacitor according to claim 17, wherein the olefin-type polymerization catalyst is an olefin-type polymerization catalyst containing the solid titanium catalyst component (I), the organometallic compound catalyst component (II) and an aromatic carboxylic acid ester.

19. The biaxially stretched polypropylene film for a capacitor according to claim 16, wherein the olefin-type polymerization catalyst is an olefin-type polymerization catalyst containing the solid titanium catalyst component (I), the organometallic compound catalyst component (II) and an aromatic carboxylic acid ester.

\* \* \* \* \*